United States Patent [19]
Ishitoya et al.

[11] Patent Number: 5,961,902
[45] Date of Patent: Oct. 5, 1999

[54] MANUFACTURING METHOD FOR MOLDED MULTILAYER ARTICLE

[75] Inventors: Katsunori Ishitoya, Toyota; Minoru Takaishi; Michihiro Okochi, both of Kawasaki; Hideyuki Iwamoto, Fukushima-ken; Sakuyoshi Nakagami, Oita; Kazufumi Tanaka, Ichihara, all of Japan

[73] Assignees: Araco Kabushiki Kaisha, Japan; Showa Denko Kabushiki Kaisha, Japan

[21] Appl. No.: 08/750,124

[22] PCT Filed: Mar. 7, 1996

[86] PCT No.: PCT/JP96/00592

§ 371 Date: Mar. 27, 1997

§ 102(e) Date: Mar. 27, 1997

[87] PCT Pub. No.: WO96/30185

PCT Pub. Date: Oct. 3, 1996

[30] Foreign Application Priority Data

| Mar. 27, 1995 | [JP] | Japan | 7-068298 |
| Apr. 27, 1995 | [JP] | Japan | 7-103510 |
| Apr. 27, 1995 | [JP] | Japan | 7-103511 |
| Sep. 14, 1995 | [JP] | Japan | 7-237251 |
| Sep. 14, 1995 | [JP] | Japan | 7-237252 |
| Sep. 14, 1995 | [JP] | Japan | 7-237253 |

[51] Int. Cl.⁶ .......................... B29C 43/04; B29C 44/06; B29C 44/12; B29C 47/06
[52] U.S. Cl. ..................... 264/45.9; 156/79; 264/46.4; 264/46.5; 264/46.8; 264/163; 264/571
[58] Field of Search ................ 156/78, 79; 264/45.9, 264/46.4, 163, 571, 46.5, 46.8

[56] References Cited

U.S. PATENT DOCUMENTS

| 3,175,936 | 3/1965 | Squier et al. | 264/46.4 |
| 4,528,219 | 7/1985 | Yamada et al. | 428/35 |
| 4,565,723 | 1/1986 | Hirsch | 264/45.9 |
| 4,816,093 | 3/1989 | Robbins, III. | 156/69 |
| 4,873,045 | 10/1989 | Fujita et al. | 264/259 |
| 5,292,465 | 3/1994 | Kobayashi et al. | 264/328.7 |
| 5,393,474 | 2/1995 | Souders | 264/163 |
| 5,424,017 | 6/1995 | Hinduja et al. | 264/163 |

Primary Examiner—Allan R. Kuhns
Attorney, Agent, or Firm—Parkhurst & Wendel, L.L.P

[57] ABSTRACT

A multilayer article such as a door trim board is fabricated by the steps of extruding melted resin layers (13m), (12m) and (11m) respectively forming a soft skin material (13), a foamed soft intermediate layer (12) and a base member (11) in the form of a multilayer resin sheet from a die-head (40) of an extruding machine, supply the extruded multilayer resin sheet to a molding machine in such a manner that the resin layer for the skin material is placed on a lower molding die of the molding machine and molding the resin layers in the form of the multilayer article. The resin layer for the skin material consists of thermoplastic elastomer, the resin layer for the intermediate layer consists of ethylenic copolymer copolymerized with ethylene and at least radical copolymerizable acid anhydride, and the resin layer for the base member consists of olefinic resin. The thermoplastic elastomer for the skin material is prepared in the form of olefinic thermoplastic elastomer and/or styrenic thermoplastic elastomer The melting flow rate of the thermoplastic elastomer is determined to be 0.1–200 g/10 min at 230° C. under load of 2.16, and the shore A hardness of the elastomer is determined to be in a range of 50–96.

31 Claims, 11 Drawing Sheets

MANUFACTURING METHOD FOR MOLDED MULTILAYER ARTICLE

BACKGROUND OF THE INVENTION

1. Field of the Invention

The present invention relates to a manufacturing method of a molded multilayer article such as a door trim board or an interior material of automotive vehicles, an interior or exterior material of houses, etc., and more particularly to a manufacturing method of a molded multilayer article the outer surface of which has a soft feeling.

2. Technical Background of the Invention

As a molded multilayer article described above, there is a door trim board of an automotive vehicle which is composed of a base member of wooden material or synthetic resin material formed in a predetermined shape and covered with a skin material through a foamed intermediate layer.

During a manufacturing process of the door trim board, as shown in FIG. 15, an adhesive is sprayed on the surface of a porous wooden base member 1 and once dried. Thereafter, the porous wooden base member 1 is placed on a vacuum molding die 5, and a skin material 2 composed of a skin layer 2b of soft synthetic resin formed in a sheet and backed with a foamed soft layer 2a is retained by a support frame 3 at its outer periphery. The skin material 2 is moved down after softened by a far infrared rays heater and placed of the base member 1 and an upper peripheral portion of the vacuum molding die 5. In such a condition, a suction passage 6 and its branch passages 6a in the molding die 5 are applied with negative pressure from a vacuum source 7. Thus, the skin material 2 is sucked by the negative pressure applied from the branch passages 6a through the porous base member 1 and is adhered to the whole surface of base member 1. After being removed from the molding die 5, the skin material 2 adhered to the base member 1 is cut out in such a manner that an outer periphery of the skin material 2 is protruded out of the base member 1. The protruded outer peripheral portion of the skin material 2 is rolled inwardly and adhered to the outer periphery of the base member 1 to complete the door trim board.

Since in such a conventional manufacturing process, an adhesive is used to adhere the skin material 2 to the base member 1, the working environment is injurious to health and the working process is complicated. To solve such problems, there has been proposed a manufacturing method of the door trim board comprising the steps of setting a skin material backed with a foamed layer on a molding die, melting synthetic resin supplied into the molding die and compressing the melted synthetic resin to form a base member covered with the skin material. Although such a manufacturing method is useful to improve the working environment and to simplify the working process, the skin material is damaged by heat and pressure during the mold process of the base member, and the appearance of tile skin material is spoiled by, unevenness of the molded surface of the skin material, pockmarks or the like.

In any case of the conventional manufacturing methods, it is, however, required to install a molding machine and an adhesion device for preliminarily preparing a skin material composed of a skin layer backed with a foamed layer. Since after the molding process, the processes for trimming the outer periphery of the skin material, for inwardly rolling the outer periphery of the skin material and adhering the same to the outer periphery of the base member are required, the manufacturing cost of the door trim board is increased due to requirement of the devices for the foregoing processes. Since in addition, the skin material is retained on the molding die at its outer periphery in such a manner as to fully cover the base member, the skin material must be prepared in a large size for trimming. This causes a large amount of useless remainders of the skin material.

SUMMARY OF THE INVENTION

To solve the problems discussed above, an object of the present invention is to provide a method capable of manufacturing a molded multilayer article superior in an appearance and a cushion feel at a low cost.

According to the present invention, there is provided a manufacturing method of a multilayer article composed of a soft skin material, a foamed soft intermediate layer and a base member, which comprises the steps of extruding semi-melted resin layers for the skin material, intermediate layer and base member in the form of a multilayer resin sheet from a die-head of an extruding machine, supplying the melted resin layers in the form of the multilayer resin sheet to a molding machine in such a manner as that the melted resin layer for the base member is placed on a lower molding die of the moving down an upper molding die of the molding machine to mold machine, and molding the melted resin layers under pressure on the lower molding die.

In the present invention, it is preferable that the resin layer for the skin material consists of thermoplastic elastomer, the resin layer for the intermediate layer consists of ethylenic copolymer copolymerized with ethylene and radical polymerizable acid anhydride and including a foaming agent, and the resin layer for the base member consists of olefinic resin. Preferably, the thermoplastic elastomer for the skin material is prepared in the form of olefinic thermoplastic elastomer and/or styrenic thermoplastic elastomer which is prepared to have a melting flow rate of 0.1–200 g/10 min at 230° C. under load of 2.16 kg and a shore A hardness in a range of 50–96.

In the present invention, the melted resin layers for the skin material, intermediate layer and base member may be layered in the interior of the die-head of the extruding machine and extruded in the form of a multilayer resin sheet from the die-head. Alternatively, the melted resin layer for the base member may be extruded in the form of a single layer sheet from the die-head of the extruding machine, wherein the melted resin layers for the skin material and intermediate layer are layered in the interior of the die-head of the extruding machine and layered on the extruded resin layer for the base member after extruded in the form of a multilayer resin sheet from the die-head. The melted resin layers for the intermediate layer and base member may be also layered in the interior of the die-head and extruded in the form of a multilayer resin sheet from the die-head of the extruding machine, wherein the melted resin layer for the skin material is layered on the extruded resin layer for the intermediate layer after extruded in the form of a single layer sheet from the die-head.

In the present invention, the resin layer for the intermediate layer is foamed after melted in the extruding machine.

According to an aspect of the present invention, the multilayer article is fabricated by the steps of setting a preliminarily molded base member on a lower molding die of a molding machine to be heated, extruding melted resin layers for the skin material and intermediate layer in the form of a multilayer resin sheet from a die-head of an extruding machine, supplying the extruded resin layers to the molding machine in such a manner that the resin layer for the intermediate layer is layered on the base member, clamping a heated upper molding die with the lower molding die to foam the resin layer for the intermediate layer and cooling the molding dies. In the multilayer article, it is preferable that the base member is made of a wooden material.

According to another aspect of the present invention, the multilayer article is fabricated by the steps of supplying melted resin layers for the base member, intermediate layer and skin material in the form of a multilayer resin sheet to a molding machine in such a manner that the resin layer for the base member is placed on a first molding surface formed on a lower molding die of the molding machine to correspond with the bottom surface of the base member, moving down an upper molding die formed with a second molding surface corresponding with the surface of the skin material and clamping the upper molding die with the lower molding die in a condition where the upper molding die is positioned to form a clearance between the first and second molding surfaces larger than the thickness of the multilayer resin sheet, heating the upper molding die to foam the resin layer for the intermediate layer until the surface of the resin layer for the skin material is pressed into contact with the second molding surface and cooling the melted resin layers for the base member, intermediate layer and skin material.

In the present invention, it is preferable that the multilayer resin sheet is pressed into contact with the first molding surface of the lower molding die under vacuum pressure between the resin supply process and the die-clamping process. It is also preferable that a useless remainder portion of the multilayer resin sheet protruded outwardly from the first molding surface of the lower molding die is cut out during the clamping process of the molding dies. In the molding machine, a first stepped portion formed on the lower molding die at an outer periphery of the first molding surface and a second stepped portion formed on the upper molding die at an outer periphery of the second molding surface are coupled with each other to cut out the useless remainder portion of the multilayer resin sheet during the clamping process of the molding dies. During the foaming process, the resin layer for the intermediate layer is heated by energization of a surface heater provided on the second molding surface of the upper molding die. Alternatively, the resin layer for the intermediate layer may be heated by energization of surface heaters respectively provided on the first and second molding surfaces of the molding dies.

During the resin supply process, the melted resin layers for the base member, intermediate layer and skin material are simultaneously extruded from extrusion slits of the die-head of the extruding machine while the die-head is being moved in a horizontal direction perpendicular to the extrusion slits.

According to a further aspect of the present invention, the multilayer article is fabricated by the steps of setting a preliminarily molded base member on a first molding surface on a lower molding die of a molding machine, supplying melted resin layers for the intermediate layer and the skin material in the form of a multilayer resin sheet to the molding machine in such a manner that the base member and an upper outer peripheral portion of the lower molding die are fully covered with the resin layer for the intermediate layer, moving down an upper molding die formed with a second molding surface corresponding with the surface of the skin material and clamping the upper molding die with the lower molding die in a condition where the upper molding die is positioned to provide a clearance between the first and second molding surfaces larger than the thickness of the base member and the multilayer resin sheet, heating the upper molding die to foam the resin layer for the intermediate layer until the surface of the resin layer for the skin material is pressed into contact with the second molding surface and cooling the resin layers for the intermediate layer and skin material.

In the multilayer articles fabricated in such a manner as described above, it is preferable that the preliminarily molded base member is made of a porous material such as a wooden material.

In the present invention, it is preferable that the multilayer resin sheet is pressed into contact with the base member and the upper outer peripheral portion of the lower molding die under vacuum pressure between the resin supply process and the die-clamping process. It is also preferable that a useless remainder portion of the multilayer resin sheet protruded outwardly from the first molding surface of the lower molding die is cut out during the clamping process of the molding dies. In the molding machine, a first stepped portion formed on the lower molding die at an outer periphery of the first molding surface and a second stepped portion formed on the upper molding die at an outer periphery of the second molding surface are coupled with each other to cut out the useless remainder portion of the multilayer resin sheet during the clamping process of the molding dies. During the foaming process, the resin layer for the intermediate layer is heated by energization of a surface heater provided on the second molding surface of the upper molding die. During the resin supply process, the melted resin layers for the intermediate layer and skin material are simultaneously extruded from extrusion slits of the die-head of the extruding machine while the die-head is being moved in a horizontal direction perpendicular to the extrusion slits of the die-head.

DESCRIPTION OF PREFERRED EMBODIMENTS

Figure 4:
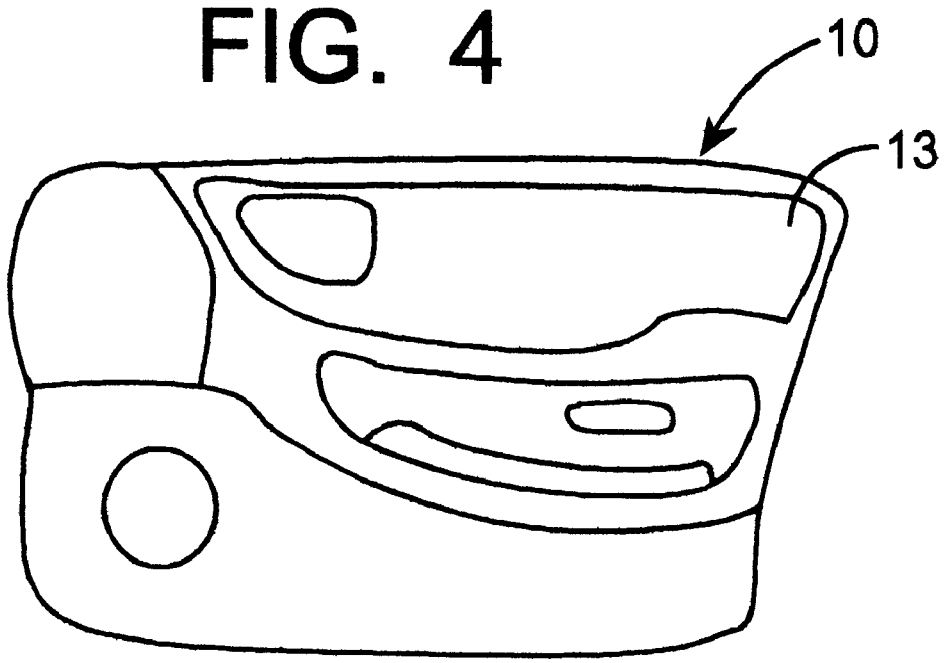
FIG. 4 is a front view of a door trim board manufactured by the present invention.
Figure 5:
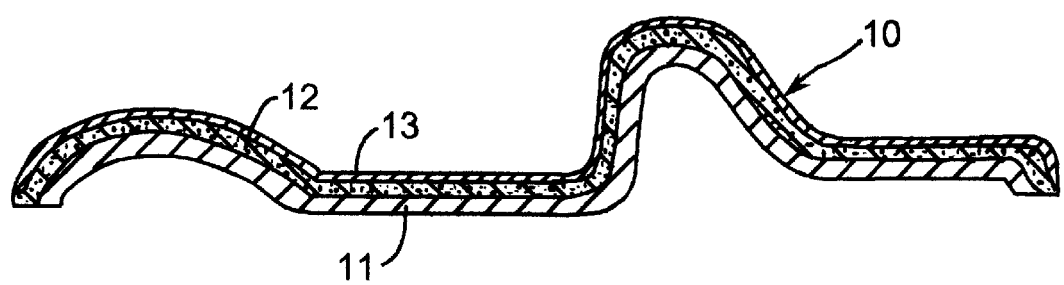
FIG. 5 is a sectional view of the door trim board manufactured by the present invention.

Hereinafter, preferred embodiments of the present invention adapted to manufacture a door trim board of an automotive vehicle will be described with reference to the drawings. As shown in FIGS. 4 and 5, the door trim board 10 manufactured by the present invention is composed of a rigid base member 11 covered with a soft skin material 13 through a foamed soft intermediate layer 12. In FIG. 5, a cross-section of the door trim board 10 is shown in an enlarged scale to clearly illustrate the detail of the door trim board 10.

Figure 1:
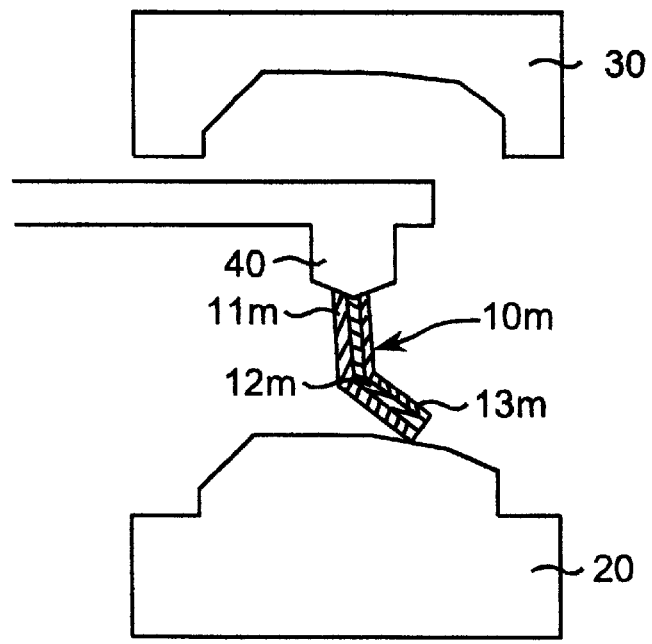
FIG. 1 is a sectional view illustrating a condition in which melted synthetic resin layers are placed on a lower molding die of a molding machine in a first embodiment of a manufacturing method of a multilayer article in accordance with the present invention.
Figure 2:
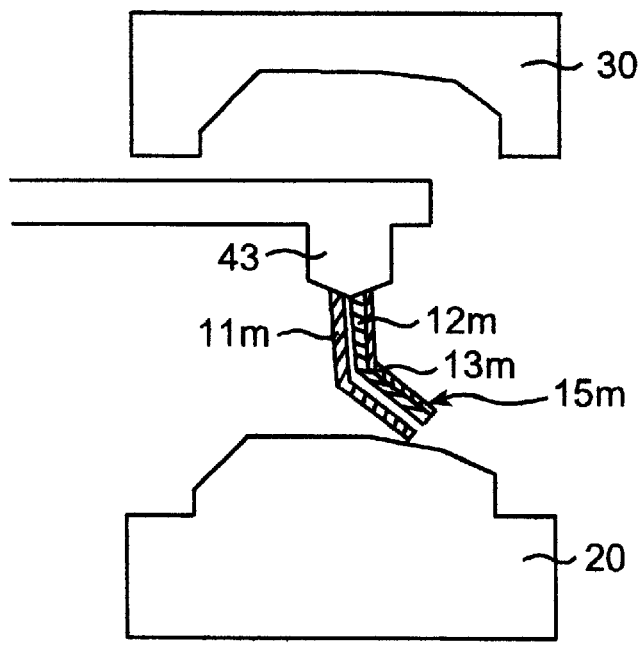
FIG. 2 is a sectional view illustrating a condition in which melted synthetic resin layers are placed on the lower molding die of the molding machine in a second embodiment of a manufacturing method of a multilayer article in accordance with the present invention.
Figure 3:
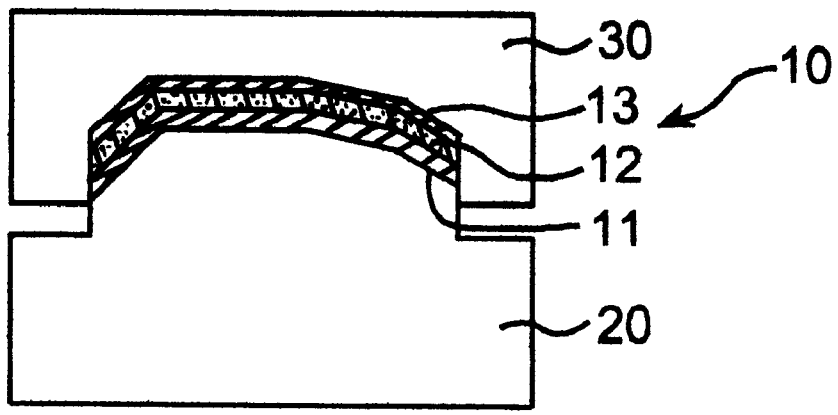
FIG. 3 is a sectional view illustrating a condition in which the melted synthetic resin layers are compressed and cooled in the first and second embodiments.
Figure 11:
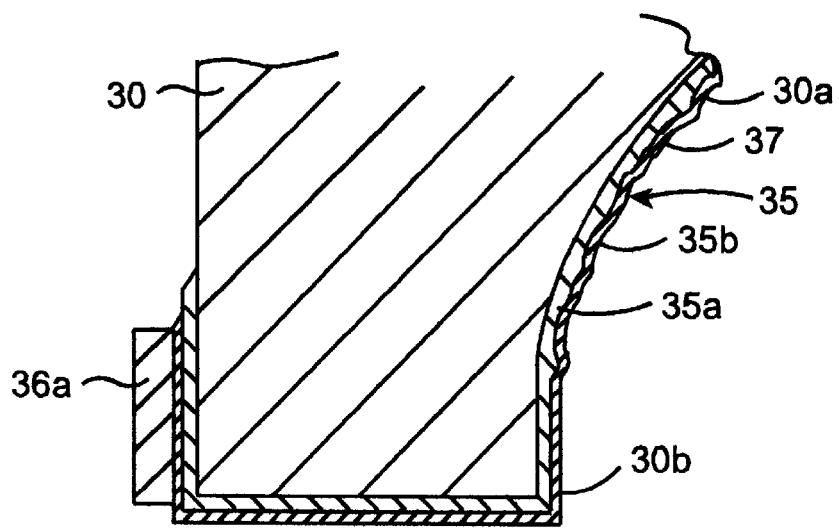
FIG. 11 is a partly enlarged sectional view of a surface heater used in the fourth embodiment.
Figure 6A:
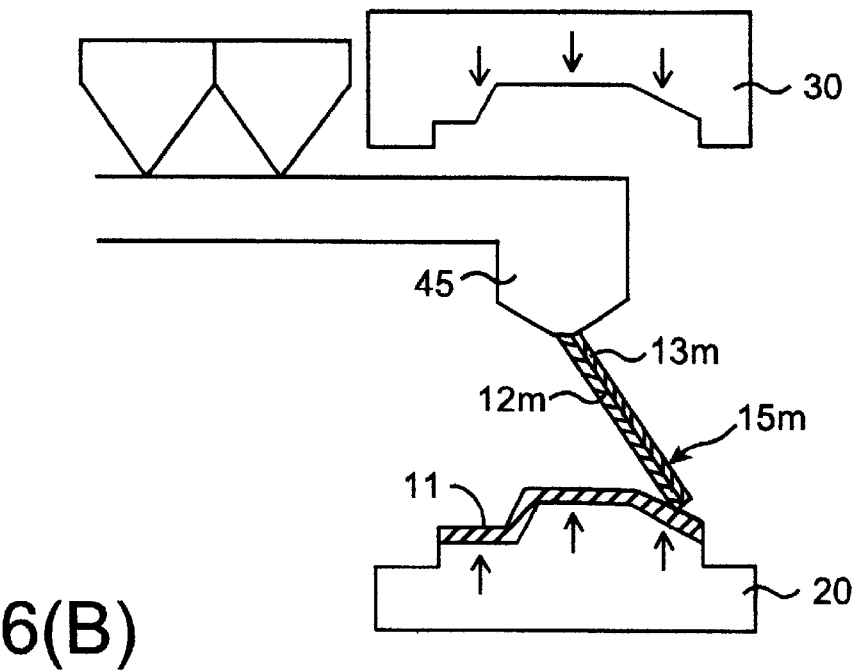
FIG. 6(A) illustrates a condition in which melted synthetic resin layers are placed on the lower molding die of the molding machine in a third embodiment of a manufacturing method of a multilayer article in accordance with the present invention.
Figure 6B:
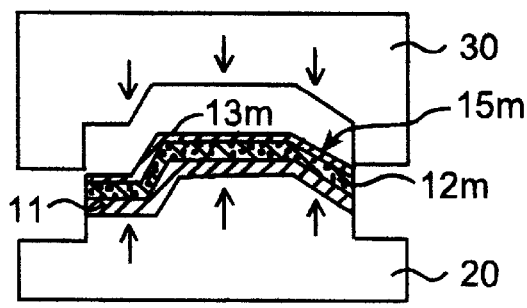
FIG. 6(B) illustrates a condition wherein an upper molding die is being moved down to be clamped with the lower molding die.
Figure 12:
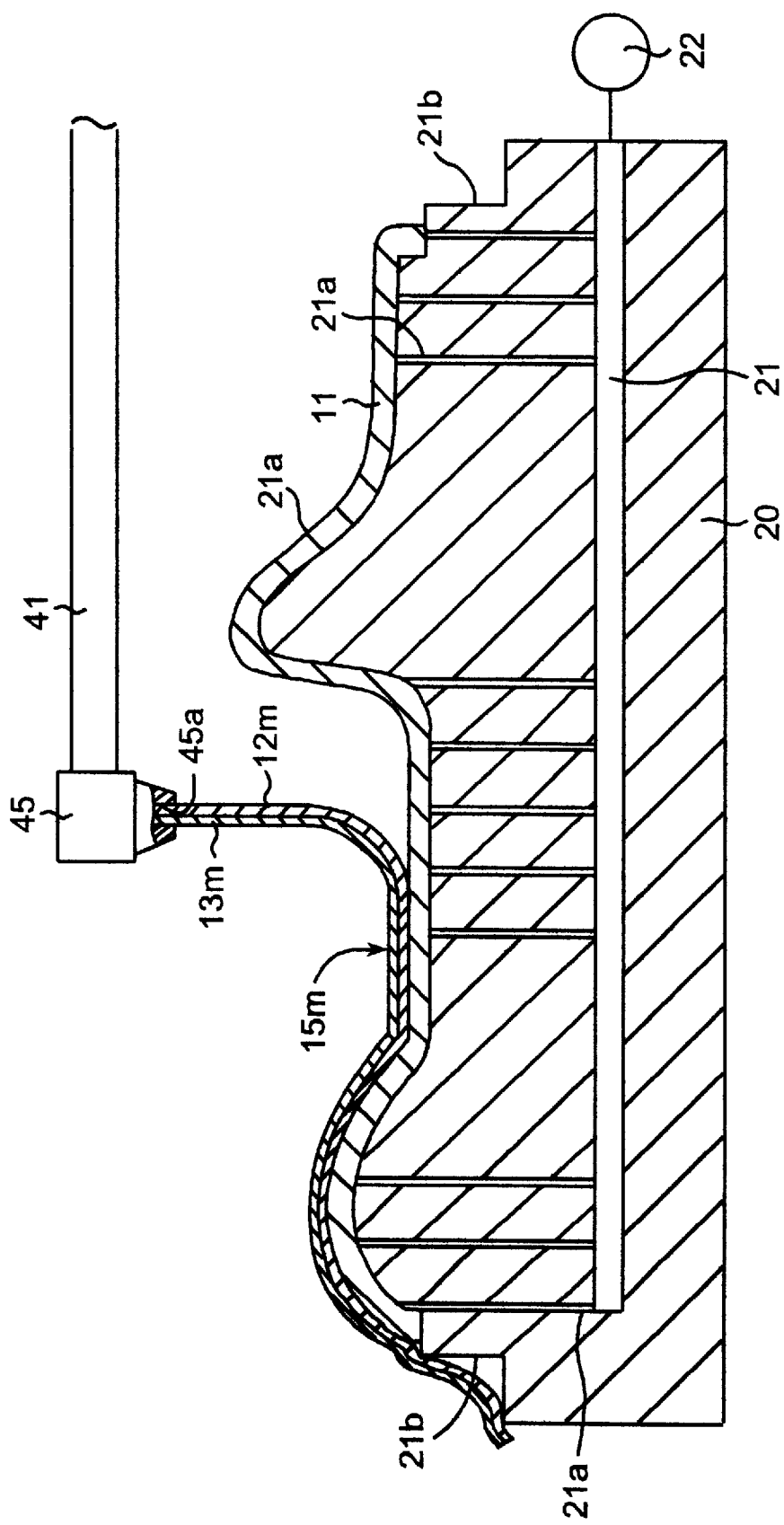
FIG. 12 is a sectional view illustrating a condition in which melted synthetic resin layers are being supplied to a molding machine in a fifth embodiment of a manufacturing method of a multilayer article in accordance with the present invention.
Figure 13:
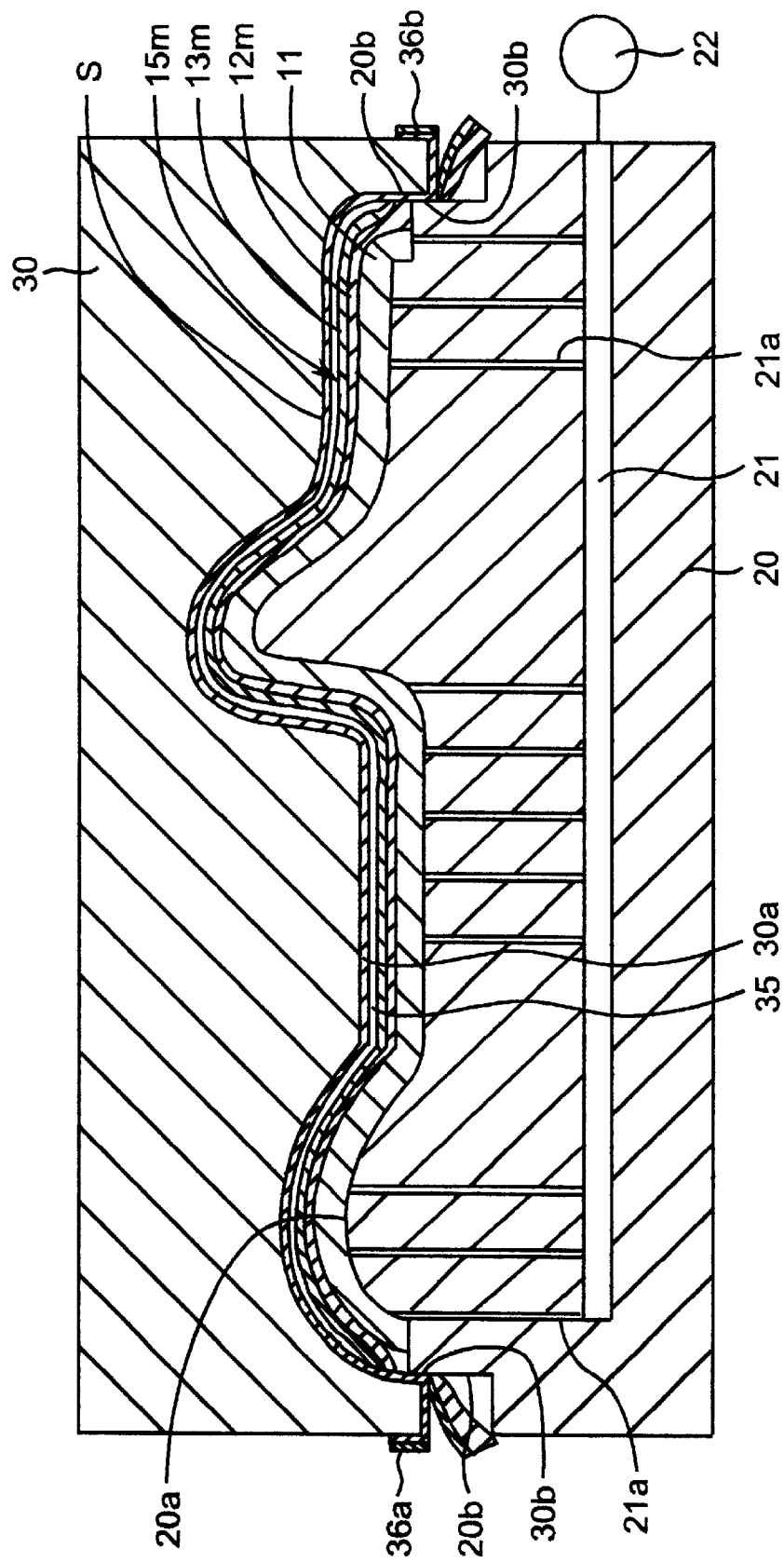
FIG. 13 is a sectional view illustrating a condition in which the molding dies have been closed in the fifth embodiment.
Figure 14:
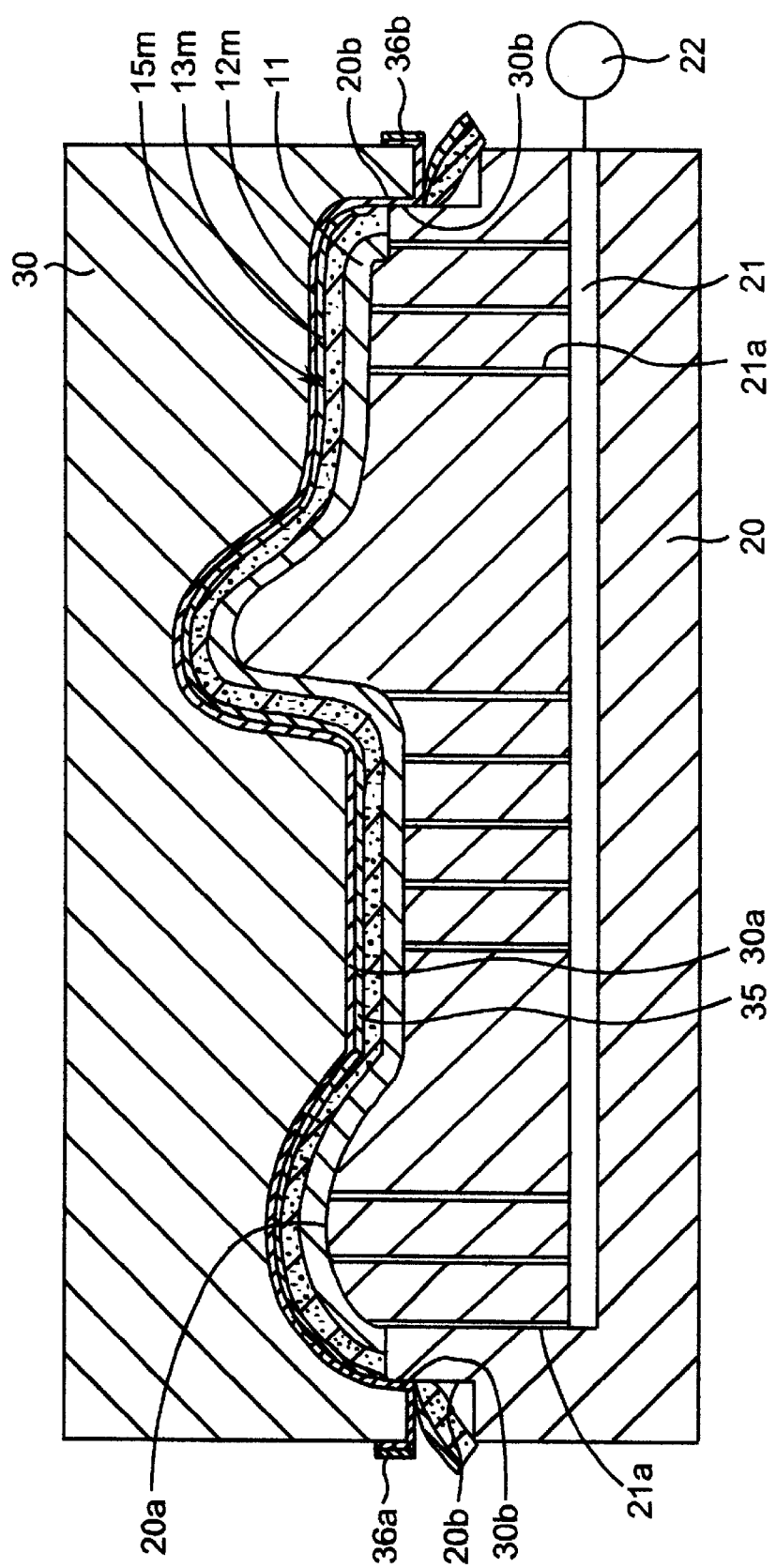
FIG. 14 is a sectional view illustrating a condition in which a foaming process has finished in the fifth embodiment.
Figure 15:
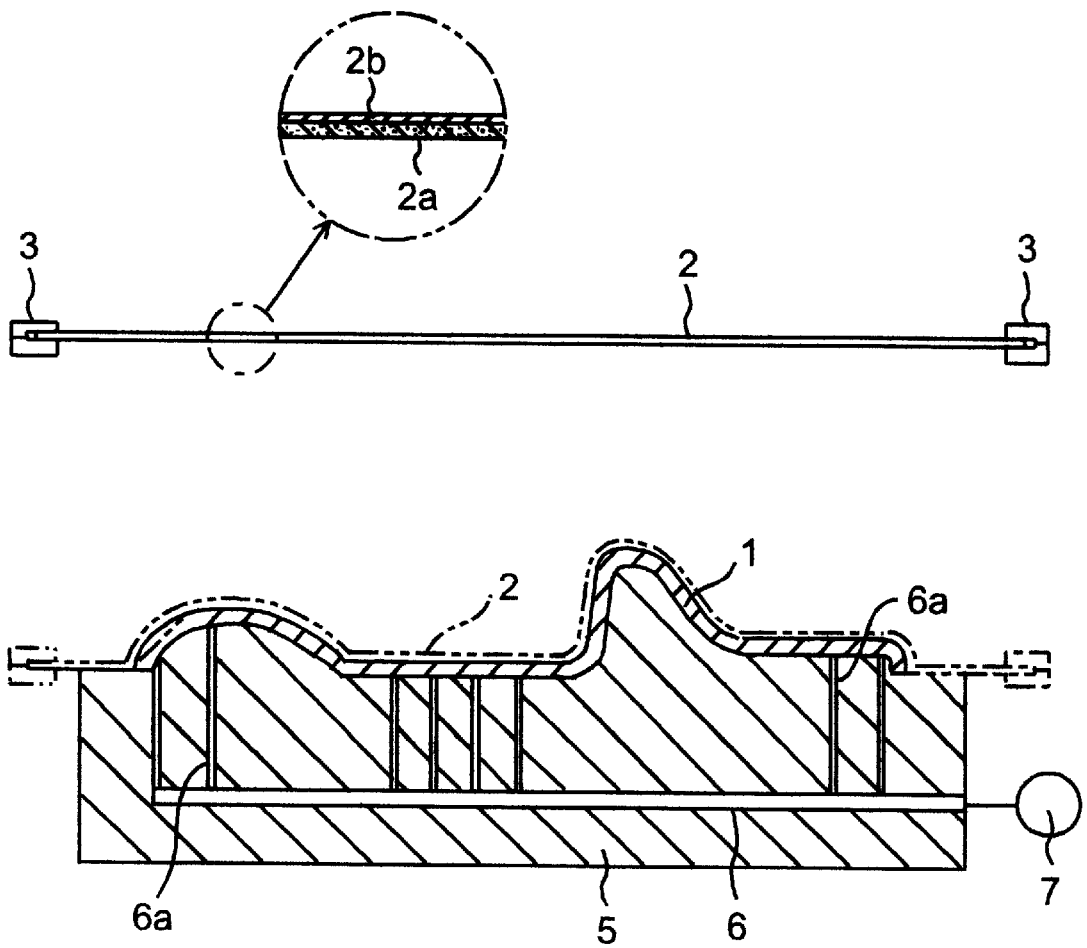
FIG. 15 illustrates a conventional manufacturing method of a multilayer article.

FIGS. 1 and 3 illustrate a first preferred embodiment of the present invention, FIGS. 2 and 3 illustrate a second preferred embodiment of the present invention, FIGS. 6(A), and 6(B) illustrate a third preferred embodiment of the present invention, FIGS. 8 to 11 illustrate a fourth preferred embodiment of the present invention, and FIGS. 12 to 14 illustrate a fifth preferred embodiment of the present invention. First of all, the skin material 13 and intermediate layer 12 used in each of the embodiments and the base member 11 commonly used in the first, second and fourth embodiments and in the third and fifth embodiments will be described. Subsequently, a molding method adapted to the door trim board 10 in each of the embodiments will be described.

(A) Skin material

The skin material 13 commonly used in the respective embodiments is made of thermoplastic elastomer such as ethylenic thermoplastic elastomer and/or styrenic thermoplastic elastomer. Particularly, hydrogen additive of styrene-butadiene copolymer elastomer containing styrene and less than 30 weight % of olefinic thermoplastic elastomer (TPO) satisfies a physical property suitable for the product appearance and the skin material and satisfies an adhesive property suitable for an interior material in a melted condition. As the olefinic thermoplastic elastomer, there are thermoplastic elastomer of the crosslinking type obtained by kneading olefinic resin and olefinic elastomer with addition of a crosslinking agent, which are disclosed in Japanese patent laid-open publication Nos. 1(1989)-197544, 2(1990)-170845, 3(1991)-64341, 3(1991)-273041, 4(1992)-25539, 4(1992)-114046, 4(1992)-180945, 4(1992)-258639 and 4(1992)-281434, thermoplastic elastomer of the blend type obtained by mixing olefinic resin and olefinic elastomer, which is disclosed in Japanese patent laid-open publication No. 5(1993)-202244, and thermoplastic elastomer of the reactor-made type obtained by blending olefinic resin and olefinic elastomer in a reactor, which is disclosed in Japanese patent laid-open publication No. 57(1982)-61012. There is also a mixture of olefinic elastomer and styrenic thermoplastic elastomer, which is disclosed in Japanese patent application No. 7(1995)-205854. Preferably, the thermoplastic elastomer used in the present invention is added with additive such as a stabilizing agent, a flame retardant, a workability improver, a lubricant, an antistatic agent, a ultraviolet absorbing agent, a coloring agent, a pigment, etc.

It is desirable that the melting flow rate (simply called MFR hereinafter) of the thermoplastic elastomer under load of 2.16 kg at 230° C. measured by JIS-K7210 is adjusted to be 0.1–200 g/10 min, preferably 1–500 g/10 min. If the melting flow rate or MFR is less than 0.1 g/10 min, the fluidity of the thermoplastic elastomer becomes insufficient, resulting in a difficulty of thickness control and defects in the appearance. If the melting flow rate or MFR is more than 200 g/10 min, it becomes impossible to extrude the skin material 13 and intermediate layer 12 in the form of a multilayer resin sheet in a melted condition from a die-head of an extrusion machine. As a result, there will occur a mixture of the two layers when heated, causing problems in the molding process and resulting in deterioration of a physical property such as beat resistance, flaw resistance or the like required for the skin material.

The shore A hardness of the thermoplastic elastomer is determined to be 50–96. The shore A hardness is measured according to ASTM-D2240. If the shore A hardness is less than 50, the surface of the skin material is softened in excess, causing a sticky feeling and a decrease of the flaw resistance. If the shore A hardness is more than 96, the surface of the skin material becomes hard, resulting in deterioration of the soft feeling and the adhesive property to the surface of the molding die. This causes defects in the appearance such as deterioration of an embossment transfer-printing property and irregularity of gloss.

(B) Intermediate layer

The intermediate layer commonly used in the respective embodiments of the present invention is made of ethylenic copolymer (a) copolymerized with ethylene and radical poly merizable acid anhydride and containing a foaming agent as disclosed in Japanese patent laid-open publication Nos. 7(1995)-41591, 7(1995)-90103 and 7(1995)-138398. The ethylenic copolymer may be substituted for graft copolymer copolymerized with polyethylene and radical polymerizable acid anhydride.

The radical polymerizable acid anhydride may be prepared in the form of unsaturated carboxylic acid anhydride having 4 to 50 carbon atoms such as maleic anhydride, itaconic acid anhydride, citraconic acid anhydride, eudic acid anhydride, dodecenyl succinic acid anhydride, 1-butene-3,4-dicaboxylic acid anhydride, alkadienyl succinic acid anhydride having at most 18 carbon atoms and a double bond at its distal end, etc. In addition, the ethylenic copolymer (a) used in the present invention may be prepared in the form of multi-way polymer copolymerized by addition of monomer copolymerizable with ethylene, other than ethylene and radical copolymerizable acid anhydride. For example, the monomer is prepared in the form of unsaturated carboxylic alkyl ester such as methyl (meth)acrylate, ethyl (meth)acrylate, propyl (meth)acrylate, buthyl (meth) acrylate, hexyl (meth)acylate, octhyl (meth)acrylate, lauryl (meth)acrylate, benzyl (meth)acrylate, dimethyl fumarate, dimethyl maleate or the like; vinyl ester such as vinyl acetate ester, vinyl propionate ester or the like; ethylenic unsaturated ether compound such as methyl vinyl ester, ethyl vinyl ether, propyl vinyl ether, buthyl vinyl ether or the like; ethylenic unsaturated hydrocarbon compound such as styrene, α-methylstyrene, norbornane, butadiene and the like; (meth)acrylonitrile, acrolein, crotonaldehyde, trimethoxyvinylsilane, trimethoxysilylpropyren (meth) acrylate ester, vinyl chloride, vinylidene chloride and the like. These may be used individually or in a combination more than two kinds of monomers.

The ratio of the radical copolymerizable acid anhydride used in the ethylenic copolymer is determined to be 0.1–40 weight %, preferably 0.5–30 weight %, more preferably 1–5 weight %. The melting flow rate or MFR of the ethylenic copolymer (a) (measured by the method of JIS K7210, condition 4) is determined to be 0.01–700 g/10 min, preferably 0.05–500 g/10 min, more preferably 0.1–300 g/10 min.

The foaming agent used in the present invention is prepared to be decomposed at a temperature of 100–250° C. higher than the melting temperature of the ethylenic copolymer. Preferably, the decomposition temperature of the foaming agent is determined to be more than 120° C., desirably more than 130° C. For example, the foaming agent is selected from the group of compounds such as dinitrosopentamethylenetetramine, azobisisobuthyronitrile, azodicarbonamide, para-toluenesulfonyl hydrazide, 4,4-oxybisbenzenesulfonylhydrazide, hydradine or a mixture of these compounds. The foaming agent may be added with a foaming assistant agent to enhance the foaming effect. As the forming assistant agent, zinc oxide, lead sulfate, urea, zinc stearate, salicylic acid, phthalic acid, boric acid, urea resin may be used. The mixture amount of the foaming agent is determined to be 0.1–40 weight part relative to 100 weight part of the ethylenic copolymer, preferably 1.0–35 weight part, more preferably 2.0–30 weight part. If the composition ratio of the foaming agent is less than 0.1 weight part, the foaming rate becomes insufficient. If the composition ratio of the foaming agent is more than 40 weight part, the cushion property will be deteriorated.

To enhance the heat resistance of the intermediate layer 12, the ethylenic copolymer may be added with a compound selected from the following compounds.

1) ethylenic copolymer (b)

2) a reactive compound the molecule of which includes functional groups more than two groups reactive with a unit of the radical polymerizable acid anhydride in the ethylenic copolymer (a)

3) organic peroxide

In the ease that these compounds are added to the ethylenic copolymer, a crosslinking structure is introduced into the intermediate layer without using a special device such as an electronic ray radiation device thereby to enhance the heat resistance of the intermediate layer. The ethylenic copolymer (b) is obtainable by copolymerizing ethylene with a polymerizable compound selected from the group consisting of a polymerizable compound including hydroxyl group, a polymerizable compound including carboxyl group, a polymerizable compound including amino group, a polymerizable compound including epoxy group, and a polymerizable compound including isocyanate (hereinafter simply referred to the polymerizable compound). The content of a unit of the polymerizable compound in the ethylenic copolymer (b) is determined to be 0.1–40 weight %, preferably 0.2–35 weight %, more preferably 0.5–30 weight %.

Preferably, the polymerizable compound including hydroxyl group is selected from the group consisting of hydroxyalkyl(meth)acrylate having 3 to 25 carbon atoms, hydroxyalkyl(meth)acrylamide having 3 to 25 carbon atoms. 2-hydroxyethyl(meth)acrylate, 2-(2-hydroxyethoxy)ethyl acrylate, 2-hydroxycyclohexyl acrylate, (1-hydroxycyclohexyl)methyl acrylate, 2-(2-hydroxy-1,1-dimethylethoxy)-1,1-dimethyl acrylate, 2-hydroxy-3-piperidinopropyl acrylate, 2-hydroxy-2-phenylethyl acrylate, 2-hydroxy-3-phenoxypropyl acrylate, 2-hydroxybuthyl acrylate, 2-hydroxypropyl acrylate, 3-hydroxypropyl acrylate, N-(2-hydroxyethyl) acrylamide, N-(2-propyl) acrylamide, N-(1,1-dimethyl-2-hydroxyethyl) acrylamide, N-(1,1-dimethyl-3-hydroxybuthyl) acrylamide, N-[1,1-bis(hydroxymethyl)ethyl] acrylamide, N,N-bis(2-hydroxyethyl) acrylamide, N-(2-hydroxyethyl) methacrylamide, N-(1,1-dimethyl-2-hydroxyethyl) methacrylamide, N-(2,2-dimethyl-2-hydroxyethyl) methacrylamide, N-(1-ethyl-2-hydroxyethyl) methacrylamide, N-[1,1-bis(hydroxymethyl)ethyl] methacrylamide, N-[2-hydroxy-1,1-bis(hydroxymethyl)ethyl] methacrylamide, N-(1,1-dimethyl-3-hydroxybuthyl)methacrylamide, N-(2-hydroxyethyl)-N-methylmethacrylamide, 2-hydroxyethyl methacrylate, 3-hydroxybuthyl methacrylate and 2-hydroxypropyl methacrylate.

The polymerizable compound including carboxyl group is in the form of unsaturated monocarboxylic acid or maleic acid having at most 25 carbon atoms, unsaturated carboxylic acid having 4 to 50 carbon atoms such as litaconic acid, tetrahydrophthalic acid or citraconic acid. Particularly, acrylic acid, crotonic acid, 2-ethylacrylic acid, 3,3-dimethylacrylic acid, 3-propylacrylic acid, 3-isopropylacrylic acid, trimethylacrylic acid, 3-buthylacryl acid, 2-methyl-2-hexaoic acid, 3-methyl-3-propylacrylic acid, 2,3-diethyl-acrylic acid may be used as the polymerizable compound.

The polymerizable compound including amino group is in the form of radical polymerizable unsaturated amine having 3 to 25 carbon atoms, (alkyl)aminoalkyl(meth)acrylate having 3 to 25 carbon atoms or (alkyl)aminoalkyl(meth) acrylamide having 3 to 25 carbon amide. Particularly, vinylbenzylamine, vinylcyclohexylamine, N,N-dimethylvinylamine, N,N-diethylvinylamine, N,N-diphenylvinylamine, 1,1-bis(dimethylamino)ethylene, 1,1-bis(diethylamino)ethylene may be used as the polymerizable compound.

The polymerizable compound including epoxy group is represented by the following structural formula.

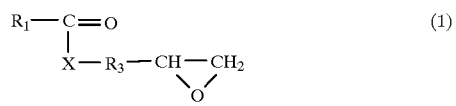

(1)

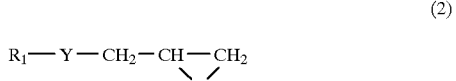

(2)

-continued

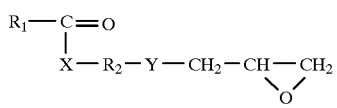

(Provided that, $R_1$ represents hydrocarbon radical of 2–18 carbon atoms having an ethylenic unsaturated connection, $R_2$ represents linear chain or ramificated alkylene group of 1–12 carbon atoms, X represents —O— or —NH—, and Y represents —$CH_2$—O— or the following structural formula.

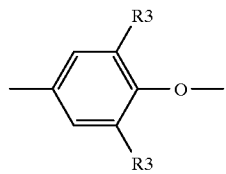

(Provided that, R3 represents hydrogen or methyl group)

In a practical embodiment, glycidyl (meth)acrylate, glycidyl (meth)acrylamide, glycidylalkyl (meth)acrylate, itaconic acid glycidyl ester, allylgylcidyl ether, 2-methallylglycidyl ether, styrylglycidyl ether or (4-glycidyloxy-3,5-dimethylphenyl)methyl (meth) acrylamide may be used as the polymerizable compound.

The polymerizable compound including isocyanate group is in the form of butenediisocyanate, 1,3-butadiene-1,4-diisocyanate, 2-buthynylene-1,4-diisocyanate or methacrylisocyanate. Furthermore, the ethylenic copolymer (b) used in the present invention may be in the form of multi-way polymer copolymerized with ethylene by addition of other copolymerizable monomer. For example, the other monomer is selected from the group consisting of unsaturated carboxylic alkyl ester such as methyl (meth)acrylate, ethyl (meth)acrylate, propyl (meth)acrylate, buthyl (meth) acrylate, hexyl (meth)acylate, octhyl (meth)acrylate, lauryl (meth)acrylate, benzyl (meth)acrylate, dimethyl fumalate, dimethyl maleate; ethylenic unsaturated ether compound such as vinyl acetate ester, vinyl propionate ester, methyl vinyl ether, ethyl vinyl ether, propyl vinyl ether, buthyl vinyl ether or the like; ethylenic unsaturated hydrocarbon compound such as styrene, α-methylstyrene. norbornane, butadiene or the like; (meth)acrylonitrile, acrolein, crotonaldehyde, trimethoxyvinylsilane, trimethoxysilylpropyren (meth)acrylate ester, vinyl chloride, vinylidene chloride or the like. These compounds may be used individually or in a combination of more than two kinds of compounds.

The melting flow rate or MFR of the ethylenic copolymer (b) (measured with reference to the table 1 and condition 4 of JIS K 7210) is determined to be 0.01–700 g/10 min, preferably 0.05–500 g/10 min, more preferably 0.1–300 g/10 min. The content of the ethylenic copolymer (b) is determined to 0.1–80 weight part relative to 100 weight part of the ethylenic copolymer (a), preferably 3–60 weight part, more preferably 10–40 weight part.

The reactive compound the molecule of which includes functional groups more than two groups reactive with a unit of the radical polymerizable acid anhydride in the ethylenic copolymer (a) represents a reactive compound including in its molecule more than two groups selected from hydroxyl group, amino group, epoxy group and isocyanate group.

For example, the reactive compound including hydroxyl group is in the form of a glycol compound such as ethylene glycol, diethylene glycol, triethylene glycol or the like; an alcohol compound such as 1,4-butanediol, 1,6-hexanediol, 1,8-octanediol, 1,10-decanediol, trimethylolethane, trimethylolpropane, pentaerythritol, dipentaerythritol or the like; sugars such as arabitol, sorbitol, sorbitan, xylose, araminose, glycol, galactose, sorbose, fructose, palatinose, malttriose, maleditose or the like; or polyorefinic oligomer having plural hydroxy groups.

The polyfunctlonal compound having hydroxyl group is the form of a polyoxyalkylene compound having a structure in which ethylene oxide or propylene oxide is added to polyvalent alcohol. For example, the polyoxyalkylene compound is in the form of ethylene oxide or propylene oxide additionally reacted with 1,3-dihydroxypropane; 2,2-dimethyl-1,3-dihydroxypropane; trimethylolethane; 1,1,1-trimethylolpropane; 1,1,1-trimethylolhexane; 1,1,1-trimethyloldodecane; 2-cyclohexyl-2-methylol-1,3-dihydroxypropane; 2-(p-methylphenyl)-2-methylol-1,3-dihydroxypropane; pentaerythritol; glycerin; diglycerin; hexagylcerin; octaglycerin; decaglycerin; etc.

The polyoxyalkylene compound may be also in the form of polyglycerin ester including in its molecule more than two hydroxyl groups which are obtained by dehydrate condensation of organic carboxylic acid compound and polyglycerin. Such polyglycerin ester is prepared in the form of glycerin monostearate, glycerin mono-oleate, glycerin monolaurate, glycerin monocaprylate, glycerin monohexanoate, glycerin monophenylethyl ester, glycerin monopropionate, diglycerin monostearate, diglycerin distearate, diglycerin mono-oleate, diglycerin monohexanoate, diglycerin dioctanoate, tetraglycerin monostearate, tetraglycerin tristearate, tetraglycerin tetrastearate, tetraglycerin trihexanoate, tetraglycerin monophenylethyl ester, hexaglycerin monostearate, hexaglycerin distearate, hexaglycerin pentastearate, hexaglycerin trioleate, hexaglycerin mono-oleate, hexaglycerin pentalaurate, decaglycerin pentaoleate, decaglycerin dilaurate, pentadecaglycerin distearate, pentadecaglycerin dilaurate, pentadecaglycerin distearate, pentadecaglycerin decaoleate, octadecaglycerin tetrastearate, etc.

The other polyvalent alcoholic compound is prepared in the form of sorbitanalkyl ester obtained by dehydrate condensation of sorbitan or sorbitan derivative having more than two hydroxyl groups in its molecule and organic carboxylic acid compound. For example, such sorbitanalkyl ester is prepared in the form of sorbitan monostearate, sorbitan mono-oleate, sorbitan monolaurate, sorbitan monocaprylate, sorbitan monohexanoate, sorbitan monophenylethyl ester, sorbitan monopropionate, sorbitan tristearate, sorbitan tetrastearate, etc. In these compounds, a compound including hydroxyl groups in its molecule the number of which is 3 to 7 is preferable as the sorbitan alkyl ester.

The polyfunctional compound including plural amino groups in its molecule is prepared in the form of ethylenediamine, methylethylenediamine, ethylethylenediamine, (2-bromoethyl) ethylenediamine, vinylbenzyldiamine, N-methyl-N'-ethyl ethylenediamine, N-buthylethylenediamine, N-dodecyl ethylenediamine, diaminopropane, diaminobutane, 1,2-dimethyl-1,3-propaneamine, hexamethylenediamine, 2-methyl-1,5-pentadiamine, diaminoheptane, diamino-octane, 2,5-dimethyl-2,5-hexanediamine, diamino-nonane, diaminodecan, diaminododecan, diethylenetriamine. N-(aminoethyl)-1,3-methyldipropaneamine, 3,3'-diamino-N-methyldipropylamine, 3,3'-iminobispropylamine, tetraethylenepentamine, 1,4-diaminocyclohexane, polyethyleneimine, 4,4'-diaminophenylmethane, etc.

Alternatively, a polyfunctional compound including both of amino group and hydroxyl group may be used. For example, such a polyfunctional compound is prepared in the form of ethanolamine, 2-hydroxyethylhydoradine, 3-amino-1-propanol, DL-2-amino-1-propanol, DL-1-amino-2-propanol, 4-amino-1-butanol, 2-amino-1-butanol, 2-amino-1-pentanol, DL-2-amino-1-pentanol, 6-amino-1-hexanol, 2-(2-aminoethoxy)ethanol, etc.

The polyfunctional compound including plural epoxy groups in its molecule is prepared in the form of sorbitol polyglycidyl ether, polyglycerol polyglycidyl ether, pentaerythritol polyglycidyl ether, hydroquinone glycidyl ether, glycidylbisphenol A and its hydrolyzate, glycidyl phthalate ester, trimethylolpropane glycidyl ether, butanediol glycidyl ether, hexanetriol glycidyl ether, epoxydized soybean oil, epoxydized linseed oil, cyclohexanemethanol glycidyl ether, cycloaliphatic epoxy resin, heterocyclic epoxy resin, epoxy resin bromide, bisphenol A-epichlorohydrin resin, aliphatic epoxy resin, novolak type epoxy resin bromide, polyglycidylamine type epoxy resin, ester type epoxy resin, orthocresol novolak type epoxy resin, phenol novolak type epoxy resin, etc.

The reactive compound including plural isocyanate groups in its molecule is prepared in the form of aliphatic group diisocyanate such as ethylene diisocyanate, 1-methylene diisocyanate, tetramethylene diisocyanate, pentamethylene diisocyanate, hexamethylene diisocyanate, 2-methylbutane-1,4-diisocyanate, heptamethylene diisocyanate, octamethylene diisocyanate, nonamethylene diisocianate, decamethylene diisocyanate, undecamethylene diisocyanate, dodecamethylene diisocianate, tridecamethylene diisocyanate, hexadecamethylene diisocianate, cyclopropane-1,2-diisocyanate, cyclopropane-1,2-bis (carbonylisocyanate), cyclohexane-1,2-diisocyanate, cyclohexane-1,3-diisocyanate, 1,2-dimethylhexane-1,3-diisocyanate, 1,2-dimethylcyclohexane-ω,ω-diisocyanate, dicyclohexyldimethylmethane-4,4'-diisocianate may be used. Aromatic series diisocyanate such as m-phenylene diisocyanate, p-phenylene diisocyanate, torylene diisocyanate, 1,5-naphthylne diisocyanate, 4,4'-diphenylmethane diisocyanate, 3,3'-dimethyl-4,4'-diphenylene diisocyanate, m-xylylene diisocianate, p-xylylene diisocyanate, 1-methyl-2,4-phenylene diisocyanate, diethylbenzene diisocianate, diisopropylbenzene diisocyanate, isophorone diisocyanate, triisocyanate such as 4,4',4"-triphenylmethane triisocyanate, etc.

As the reactive compound including plural isocyanate groups in its molecule, an isocyanate (hereinafter referred to B1) including at least two protected isocyanate groups in its molecule may be used. B1 is obtained by reaction of polyfunctional isocyanate and protective agent and is represented by the following structural formula.

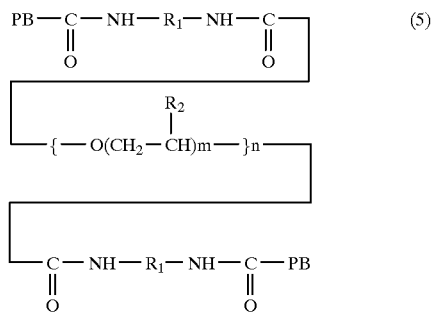

(5)

(In the above formula, PB is a remainder of the protective agent of isocyanate group, R1 is hydrocarbon of carbon atoms 2–20 in the form of a remainder of bivalent isocyanate, R2 is hydrogen atom or methyl group, m is an integer of 1–5, and n is an integer of 1–30.)

The protective isocyanate group is thermally dissociated by heat at a specific temperature defined by the protective group and is reproduced as an isocyanate group by decomposition of the protective agent.

The polyfunctional isocyanate is selected from the group of aliphatic diisocyanate such as ethylene diisocyanate, 1-methylethylene diisocyanate, tetramethylene diisocyanate, pentamethylene diisocyanate, hexamethylene diisocianate, 2-methylbutane-1,4-diisocianate, heptamethylene diisocyanate, octamethylene diisocyanate, nonamethylene diisocyanate, decamethylene isocyanate. undecamethylene diisocyanate, dodecamethylene diisocyanate, tridecamethylene diisocyanate, hexadecamethylene diisocyanate, cyclopropane-1,2-diisocyanate, cyclopropane-1,2-bis(carbonylisocyanate), cyclohexane-1,2-diisocyanate, cyclohexane-1,3-diisocyanate, 1,2-dimethylcyclohexane-1,3-diisocyanate, 1,2-dimethylcyclohexane-3,3-diisocyanate, dicyclohexyldimethylmethane-4,4'-diisocyanate, isophorone diisocyanate, etc.; aromatic diisocyanate such as m-phenylene diisocyanate, p-phenylene diisocyanate, trylene diisocyanate, 1,5-naphthylene diisocyanate, 4,4'-diphenylmethane diisocyanate, 3,3'-dimethyl-4,4'-diphenylene diisocyanate; m-xylylene diisocyanate; p-xylylene diisocyanate; 1-methyl-2,4-phenylene diisocyanate; diethylbenzene diisocyanate; diisopropylbenzene diisocyanate, etc.; triisocyanate such as 4,4',4"-triphenylmethane triisocyanate. In these compounds, isophorone diisocyanate is more preferable.

In addition, a reactive compound composed of an excessive amount of diisocyanate and polyol of 62–2000 molecules may be used. The polyol is prepared in the form of ethyleneglycol, diethyleneglycol, triethyleneglycol, propyleneglycol, dipropyleneglycol, polypropyleneglycol, tetramethyleneglycol, hexamethyleneglycol, trimethylolpropane, pentaerythritol, etc. In these compounds, ethyleneglycol, diethyreneglycol, propyleneglycol and tetramethyleneglycol are preferable.

The protective agent Is a compound including active hydrogen reactive with isocyanate the reaction product of which is easily decomposited by heat. Such a compound is selected from the group consisting of phenol derivative. lactam derivative, a compound including active methylene, amide derivative, amine derivative, imidazole derivative, urea derivative, imine derivative, oxime derivative. In these compounds, a protective agent of phenol type, lactam type, amide acid type, active methylene type or oxime type is preferable, and the protective agent of lactam type is more preferable.

The protective agent of phenol type is prepared in the form of monohydric phenol such as phenol, cresol, xylenol, ethylphenol, nonylphenol, etc. The protective agent of lactam type is prepared in the form of β-propiolactam, γ-buthyllactam, δ-valerolactam, ε-caprolactam, etc. The protective agent of amide acid type is prepared in the form of monocarbonamide such as acetanilide, amide acetate, amide acid stearin, etc. The protective agent of active methylene type is prepared in the form of dialkyl malonate. alkyl acetoacetate (as for alkyl, methyl group or ethyl group are preferred), acetylacetone, etc. The protective agent of oxime type is prepared in the form of formaldoxime. acetoaldoxime, methyl ethyl ketone oxime, cyclohexanone oxime, etc.

In the present invention, B1 may be used individually or in a combination of more than two kinds. The dissociation temperature of B1 is determined to be preferably more than 120° C. The melting point of reaction products in the present invention is determined to be preferably less than 300° C. These reaction products may be simultaneously used in a combination of more than two kinds. In use, the content of the reaction products is determined to be 0.05–20 weight part relative to 100 weight part of ethylenic copolymer (a), preferably 0.1–18 weight part, more preferably 0.1–15 weight part.

In preparation of the organic hydroxide, it is preferable that the decomposition speed of the organic hydroxide at a temperature 15° C. higher than the melting temperature of the ethylenic copolymer (a) is more than thirty seconds at a half-life period and less than ten seconds at 280° C. Such an organic hydroxide is prepared in the form of hydroperoxide, alkylperoxide, acylperoxide, ketoneperoxide, alkylperester, peroxy dicarbonate and siliconperoxide. For example, the organic hydroxide is selected from t-buthylhydroperoxide, dicmylperoxide, 1,3-bis(t-buthylperoxy)hexane, 2,5-dimethyl-2,5-di(benzoylperoxy)hexane, 2,5-dimethyl-2,5-di(t-buthylperoxy)hexane, benzoylperoxide, methylisobuthylketoneperoxydicarbonate and vinyl-tris(t-buthylperoxy)silane, etc. These organic hydroxide compounds may be individually or in a combination of more than two kinds of the same.

The blend ratio of the organic hydroxide relative to 100 weight part of the ethylenic copolymer (a) is determined to be 0.01–3 weight part, preferably 0.015–2.5 weight part, more preferably 0.02–2 weight part. When the blend ratio of organic hydroxide is less than 0.01 weight part, the heat resistance of the intermediate layer may not be sufficiently enhanced. If the blend ratio of organic hydroxide is more than 3 weight part, there will occur undesired color and a foul smell. In the present invention, it is preferable that the intermediate layer 12 increases in volume more than 1.3 times and less than 50 times, desirably more than 1.5 times and less than 30 times. When the volume increase of the intermediate layer 12 is less than 1.3 times, the cushion feeling of the multilayer article is deteriorated. When the volume increase of the intermediate layer 12 is more than 50 times, the appearance and strength of the multilayer article is deteriorated due to interconnected bubbles in the intermediate layer.

(C) Base member

The base member in the first, second and fourth embodiments of the present invention is made of olefinic resin, preferably propylene resin. The propylene resin is prepared in the form of propylene mono-copolymer, propyleneethylene block copolymer, propylene-ethylene random copolymer, a mixture of the copolymers, other resin including the propylene resin such as polyethylene, ethylene-α-olefinic copolymer elastomer, a mixture of styrene-butadiene copolymer elastomer and its derivative, etc. In the present invention, one or more than two kinds of olefinic resins may be used and mixed with a filler material such as talc, glass fiber, wooden particles. In necessity, the additional agents such as a stabilizing agent, flame retardant, workability improver, lubricant, an antistatic agent, an ultraviolet absorbing agent, a coloring agent, pigment, etc, may be added to the olefinic resin. The base member may be foamed to be lighten. The melting flow rate or MFR may be adjusted appropriately to form the base member by injection forming and compression processes.

The melting flow rate of olefinic resin for the base member under load of 2.16 kg at 230° C. measured according to JIS-K7210 is determined to be 1–60 g/10 min, preferably 5–40 g/10 min. When the melting flow rate is less than 1 g/10 min, the fluidity of olefinic resin is insufficient to cause short shot of the product, and the olefinic resin may not be supplied in the form of a desired sheet due to small draw down during the melting process. When the melting flow rate exceeds 60 g/10 min, the mechanical property and impact resistance of the product is deteriorated, and the appearance of the product is mottled since the thermoplastic elastomer of the skin material is mixed with the intermediate layer during the compression process.

The base member used in the third and fifth embodiments of the present invention is made of materials including a wooded component as the main component and formed with a desired stiffness. Thus, a wooden base member used as an interior material of vehicle compartments or houses may be utilized as the base member of the multilayer article. For example, the base member may be provided in the form of a porous plate member made of fibers such as splitted pulp or jute hardened by thermoplastic resin such as phenol resin or pulp tip or wood dust impregnated with phenol resin and heated under pressure. The base member may be also provided in the form of a resin felt or a hard board. The wooden base member can be formed in a single layer or multilayers. In addition, the base member may be also provided in the form of a multilayer structure including a honeycomb structure made of synthetic resin films, corrugated paper board or metallic leaf or a foamed structure made of resin material.

With such a porous wooden base member as described above, a strengthen multilayer article of light weight can be provided at a relatively low cost. It is advantageous that the porous wooden base member can be adhered to the intermediate layer 12 by heat when the surface of the base member is formed coarse.

(I) First practical embodiment (ID) Molding method

In the first and third practical embodiments shown in FIGS. 1 and 3, a multilayer article in the form of a door trim board 10 is fabricated by the steps of extruding melted resin layers 13*m*, 12*m* and 11*m* respectively forming a skin layer material 13, an intermediate layer 12 and a base member 11 in the form of a multilayer resin sheet from a die-head 40 of an extruding machine, supplying the extruded resin layers onto a lower molding die 20 of a molding machine, compressing the supplied resin layers by an upper molding die 30 and lifting the upper molding die after the compressed resin layers were cooled.

The extruding machine used for extruding the melted resin layers is provided with three hydraulic cylinders for extrusion of the melted resin layers 13*m*, 12*m* and 11*m* which are arranged to properly control a retention time of melted resins and to inject or extrude the melted resins after measurement thereof. For example, an extruding machine of the in-line screw type for injection molding or an extruding machine with an accumulator is used as the extruding machine. In the case that the melted resin layers 13*m*, 12*m* and 11*m* respectively for the skin material, intermediate layer and base member are continually supplied, an extruding machine of the continuous extrusion type can be used.

In a molding process of the multilayer article, as shown in FIG. 1, the melted resin layers 13*m*, 12*m* and 11*m* respectively for the skin material 13, intermediate layer 12 and base member 11 are extruded in the form of a multilayer resin sheet 10*m* from the die-head 40 of the extruding machine and supplied to the molding machine in such a manner that the melted resin layer 11*m* for the base member is placed on the lower molding die 20. When the upper molding die 30 is moved down as shown in FIG. 3 and clamped with the lower molding die 20, the melted resin layer 12m for the intermediate layer 12 is foamed, and the melted resin layers 11m, 12m and 13m in the form of the multilayer resin sheet are compressed to form a multilayer article. In such an instance, it is preferable that the upper and lower molding dies 30 and 20 are preliminarily heated at a temperature of 80–250° C. in accordance with the heating time of the foaming agent to foam the melted resin layer 12m for the intermediate layer 12. When the heating temperature of the molding dies 30 and 20 is less than 80° C., the intermediate layer 12 may not be sufficiently foamed. When the heating temperature of the molding dies 20 and 30 is more than 250° C., it takes a long time to heat and cool the molding dies, and the foamed layer may not be obtained in a stable condition. The upper and lower molding dies may be heated at a different temperature in accordance with the kind and thickness of the skin material 13, intermediate layer 12 and base member 11. When the melted resin layer for the intermediate layer 12 is foamed in a clamped condition of the molding dies, the skin material 13 is pressed into contact with the upper molding die 30 in accordance with foaming of the intermediate layer 12 and is formed with an embossment pattern. The vertical movement of the upper molding die 30 is controlled in accordance with the foaming degree of the intermediate layer 12 to adjust the pressure acting on the skin material 13. After the intermediate layer 12 is foamed to form the embossment pattern on the skin material, the molding dies are cooled or replaced with cold molding dies to cool the molded multilayer article for removal.

(IE) Molded multilayer article

The molded multilayer article in the first embodiment is composed of the skin material 18, intermediate layer 12 and base member 11. The skin material 13 is in the form of a surface layer covering the intermediate layer 12 and forming a design surface of the article. The foamed intermediate layer 12 is adapted to form a cushion layer in the article. The base member is adapted as a backing material of the intermediate layer 12 to provide the multilayer article with a desired mechanical property. In the multilayer article, it is preferable that the thickness of the skin material 13 is determined to 0.1–2.0 mm. If the thickness of the skin material 13 is less than 0.1 mm, the intermediate layer 12 is partly exposed to deteriorate the appearance of the article. If the thickness of the skin material 13 is more than 2.0 mm., the cushion property of the intermediate layer 12 is deteriorated. Preferably, the thickness of the foamed intermediate layer 12 is determined to be 0.5 mm–15 mm. If less than 0.5 mm, the desired cushion property of the intermediate layer may not be obtained due to insufficient foam. If more than 15 mm, the article is thickened in excess, and the intermediate layer may not be uniformly heated during the foaming process, causing irregularity in the foamed layer.

It is preferable that the hardness of the multilayer article measured from its surface side is determined to be 35–90. The hardness of the multilayer article can be measured according to JIS-S6050 to determine the cushion property of the skin material in an optimal condition. When the hardness is less than 35, the multilayer article becomes soft in excess to deteriorate the feel of the arti cle. When the hardness is more than 90, the cushion property of the article is deteriorated.

The skin material 13 of the multilayer article can be formed with a desired embossment pattern. Since the skin material 13 is uniformly brought into contact with the molding surface of the die, the embossment pattern is formed on the surface of the skin material 13 in a good condition to enhance the appearance of the article.

(IF) Useful effect

With the manufacturing method of the multilayer article in the first embodiment, the skin material, the foamed intermediate layer and the base member are layered during the molding process without causing any useless remainder of the resin materials. Since the fluidity and hardness of the skin material can be properly adjusted in a simple manner, the skin material is uniformly brought into contact with the molding surface of the die to enhance the appearance of the multilayer article. In the first embodiment, it is advantageous that the melted resin layers 13m, 12m and 11 for the skin layer, intermediate layer and base member are simultaneously supplied in the form of a multilayer resin sheet on the surface of the lower molding die 20 in a stable condition.

(II) Second preferred embodiment (IID) Molding method

The second preferred embodiment shown in FIGS. 2 and 3 is distinguished from the first embodiment by the facts that after the molten resin layer 11m for the base member has been extruded in the form of a single layer resin sheet from a die-head 43 of the extruding machine, the melted resin layers 13m and 12m for the skin material and intermediate layer are layered in the interior of the die-head 43 and extruded in the form of a multilayer resin sheet 15m from the die-head 43 and that the melted resin layers 13m and 12m in the form of the multilayer resin sheet 15m are layered on the melted resin layer 11m for the base member 11 and placed on the surface of the lower molding die 20. The extruding machine used in this embodiment is substantially the same as that in the first embodiment. The die-head for extrusion of the melted resin layers 13m and 12m may be provided In the form of the same die-head as that for extrusion of the melted resin layer 11m or provided separately from the die-head for protrusion of the melted resin layer 11m.

In a molding process of the mutilayer article, as shown in FIG. 2, the melted resin layer 11m for the base member is first extruded in the form of a single layer resin sheet from the die-head 43 of the extruding machine and placed on the lower molding die 20. Subsequently, the melted resin layers 13m and 12m for the skin material and intermediate layer are extruded from the die-head 43 after layered in the form of a multilayer resin sheet 15m in the interior of the die-head 43 and placed on the melted resin layer 11m. Thereafter, the upper molding die 30 is moved down and clamped with the lower molding die 20 to form a multilayer article in the same manner as in the first embodiment.

The detail of the multilayer article in this embodiment is substantially the same as that in the first embodiment. Since in this embodiment the melted resin layer 12m for the intermediate layer is placed on the molten resin layer 11m for the base member with slight delay of a time, the melted resin layer 12m is formed at an appropriate foaming rate. The other advantage is the same in the first embodiment.

In actual practices of the present invention, the melted resin layers for the intermediate layer and base member may be layered in the interior of the die-head of the extruding machine and extruded in the form of a multilayer resin sheet from the die-head. During the molding process, the melted resin layers in the form of the multilayer resin sheet are supplied to the molding machine in such a manner that the resin layer for the base member is placed on the lower molding die. Subsequently, the melted resin layer for the skin material is extruded in the form of a single layer resin sheet from the die-head and placed on the resin layer for the intermediate layer. Thereafter, the upper molding die 30 is moved down and clamped with the lower molding die to form a multilayer article in the same manner as in the first embodiment. In use of the same die-head, the melted resin layers 12m and 11m in the form of the multilayer resin sheet 15m are placed on the lower molding die 20 slightly before extrusion of the melted resin layer 13m for the skin material. The resin layer 13m for the skin material may be extruded from another single layer die-head after supply of the resin layers in the form of the multilayer resin sheet.

In the first and second embodiments and modification described above, the melted resin layer 12m for the intermediate layer is covered with the melted resin layers 13m and 11m for the skin material and base member and foamed by heat supplied therefrom. Thus, the foaming rate of the resin layer 12m for the intermediate layer can be selectively increased at a portion adjacent to the melted resin layer 13m for the skin material. The intermediate resin layer 12m may be heated by an external heat source such as an infrared heater to shorten the foaming time.

Hereinafter, certain examples of the first and second embodiments and comparative examples thereof will be described.

(EXAMPLE 1)

The resin for the skin material 13 was prepared in the form of styrenic thermoplastic elastomer (Taftec produced by Asahi Kasei) the melting flow rate or MFR of which is 160 g/10 min at 230° C. under load of 2.16 kg and the shore A hardness of which is 62, the styrenic thermoplastic elastomer consisting of styrene-butadiene block copolymer including 30 weight % of styrene and added with hydrogen. The resin for the intermediate layer 12 was prepared in the form of a composition consisting of 100 weight part of ethylene-maleic anhydride-methyl acrylate copolymer including 2.5 weight % of maleic anhydride and 18 weight % of methyl acrylate and kneaded with 5 weight % of a diazocarbonamide foaming agent (Exceller # 25 produced by Eiwa Kasei Kogyo) in such a manner that the melting flow rate or MFR of the blend material becomes 10 g/min at 190° C. under load of 2.16 kg. The resin for the base member 11 was prepared in the form of a composition of 87 weight part of propylene-ethylene block copolymer consisting of 15 weight % of ethylene-propylene copolymer including 50 weight % of propylene and 85 weight % propylene and blended with 13 weight % of talc in such a manner that the melting flow rate or MFR of the blend material becomes 10 g/10 min. The resin materials 13m, 12m and 11m for the skin material 13, intermediate layer 12 and base member 11 were separately melted and extruded in the form of three layers at a temperature of 110–210° C. by means of a hot-flow extruding machine provided with a die-head 40 of the three layers T type. The extruded resin materials in the form of three layers were placed on the lower molding die 20 as shown in FIG. 1. Subsequently, the upper molding die 30 formed with a desired embossment pattern was moved down and clamped with the lower molding die 20 to compress the resin materials for forming a molded multilayer article. After cooling, the upper molding die 30 was lifted to take out the molded multilayer article. As shown in FIGS. 4 and 5, the molded multilayer article was composed of the skin material 13 of 0.6 mm in thickness, the intermediate layer 12 of 3 mm in thickness and the base member 11 of 2.5 mm in thickness, and the embossment pattern of the upper molding die 30 was clearly transferred to the surface of skin material 13. The multilayer article was molded in a short time without causing any useless remainder of the resin materials. The hardness of the molded multilayer article measured at its surface side by the method of JIS-S6050 was 49. The molding condition was set as described below.

Temperature of the upper molding die 30: 60° C.
Temperature of the lower molding die 20: 40° C.
Applied pressure; 25 kg/cm², Cooling time: 40 sec.

(EXAMPLE 2)

For preparation of the resin for the skin material, 22 weight part of polypropylene (MD 772H produced by Showa Denko) including 6.4 weight % of ethylene, the melting flow rate or MFR of which is 30 g/10 man at 230° C. under load of 2.16 kg, and 78 weight % of ethylene-α-olefinic copolymer (P0180 produced by Mitsui Sekiyu Kagaku) the MFR of which is 8.1 g/10 min at 230° C. under load of 2.16 kg and the shore A hardness of which is 69 were melted and kneaded by means of a bi-axial extruding machine KTX-37 (made by Kobe Seiko K.K.) to obtain thermoplastic elastomer the MFR of which is 10 g/10 min at 230° C. under load of 2.16 and the shore A hardness of which is 69. During the kneading process of the foregoing composition, 0.3 weight part of Irganox B-225 produced by Ciba-Geigy and 0.05 weight part of calcium stearate were added as a stabilizing agent to 100 weight part of the composition. The stabilizing agent was used in all the production process of compositions described later. Thus, the resin for the skin material 13 was prepared in the form of the thermoplastic elastomer. The resin for the intermediate layer 12 was prepared in the form of a blend material consisting of 100 weight part of ethylene-maleic anhydride-methyl metacrylate copolymer including 2.5 weight % of maleic anhydride and 8 weight % of methyl methacrylate and blended with 2 weight part of diazocarbonamide and 1 weight part of zinc oxide. The MFR of the blend material was determined to be 8 g/10 min at 190° C. under load of 2.16 kg. The resin for the base member 11 was prepared in the form of a blend material of 95 weight part of propylene-ethylene block copolymer consisting of 13 weight part of ethylene-propylene copolymer including 50 weight % of propylene and 87 weight part of propylene and 5 weight % of talc. The resin materials 13m, 12m and 11m for the skin material 13, intermediate layer 12 and base member 11 were separately melted and extruded in the form of three layers at a temperature of 110–200° C. from the die-bead 40 of the hot-flow extruding so machine. The extruded resin materials in the form of three layers were placed on the lower molding die 20 as shown in FIG. 1 and molded in the same manner as in the Example 1. The molded multilayer article was composed of the skin material 13 of 0.8 mm in thickness, the intermediate layer 12 of 3.7 mm in thickness and the base member 11 of 3.0 mm in thickness. The hardness of the molded multilayer article measured at its surface side by the method of JIS-S6050 was 58.

(EXAMPLE 3)

For preparation of the resin for the skin material, 20 weight part Of polypropylene (FD231 produced by Showa Denko) including 7 weight % of ethylene, the MFR of which is 2 g/10 min at 230° C. under load of 2.16 kg; 14 weight % of ethylene propylene random copolymer including 67 mol % of ethylene, the MFR of which is 0.008 g/10 min at 230° C. under load of 2.16 kg: 26 weight % of styrenic elastomer (Septon 4055 produced by Kurare) consisting of styreneisoprene block copolymer including 30 weight % of styrene and added with hydrogen; and 40 weight % of oil (PW380) were kneaded by means of the bi-axial extruding machine KTX-37 to obtain thermoplastic elastomer the MFR of which is 0.9 g/10 min at 230° C. under load of 2.16 and the shore A hardness of which is 68. Thus, the resin for the skin material 13 was prepared in the form of the thermoplastic elastomer. The resin for the intermediate layer 12 was prepared in the form of a blend material consisting of 100 weight part of ethylene-maleic anhydride-methyl acrylate copolymer including 3.0 weight % of maleic anhydride and 19 weight % of methyl acrylate and blended with 5 weight part of diazocarbonamide, 1.5 weight part of zinc oxide and 1.4 weight part of trimethylolpropane. The MFR of the blend material was determined to be 10 g/10 min at 190° C. under load of 2.16 kg. The resin for the base member 11 was prepared in the form of a blend material of 80 weight % of propylene-ethylene block copolymer consisting of 22 weight % of ethylene-propylene copolymer including 50 weight % of propylene and 87 weight % of propylene and 20 weight % of talc. The MFR of the blend material was determined to be 7 g/10 min.

The resin materials 13*m* and 12*m* for the skin material 13 and intermediate layer 12 were separately melted and extruded in the form of two layers at a temperature of 110–210° C. from the die-head 40 of the hot-flow extruding machine. The extruded resin materials in the form of two layers were placed on the lower molding die 20 together with the resin material 11*m* for the base member 11 separately melted and extruded from the die-head 40 as shown in FIG. 2 and molded in the same manner as in the Example 1. Provided that the surface temperature of the lower molding die 20 was maintained at 180° C. The molded multilayer article was composed of the skin material 13 of 1.0 mm in thickness, the intermediate layer 12 of 2.5 mm in thickness and the base member 11 of 3.0 mm in thickness. The hardness of the molded multilayer article measured at its surface side by the method of JIS-S6050 was 86.

(EXAMPLE 4)

For preparation of the resin for the skin material, 22 weight % of random polypropylene including 6.0 weight % of ethylene, the melting flow rate or MFR of which is 30 g/10 min at 230° C. under load of 2.18 kg; 33 weight % of styrenic elastomer (Septon produced by Kurare) consisting of styrene-isoprene block copolymer including 20 weight % of styrene and added with hydrogen; and 45 weight % of oil (PW380) were melted and kneaded by means of the bi-axial extruding machine KTX-37 (made by Kobe Seiko K.K.) to obtain thermoplastic elastomer the MFR of which is 10 g/10 min at 230° C. under load of 2.16 and the shore A hardness of which is 70. Thus, the resin for the skin material 13 was prepared in the form of the thermoplastic elastomer. The resin for the intermediate layer 12 was prepared in the form of a blend material consisting of 100 weight part of ethylene-maleic anhydride-buthylacrylate copolymer including 2.5 weight % of maleic anhydride and 16 weight % of butylacrylate and kneaded with 7 weight part of diazocarbonamide and 4.2 weight part of a copolymer of ethylene and 2-hydroxyethylacrylate. The MFR of the blend material was determined to be 7 g/10 min at 190° C. under load of 2.16 kg. The resin for the base member 11 was prepared in the form of a blend material of 85 weight % of propylene-ethylene block copolymer consisting of 18 weight % of ethylene-propylene copolymer including 50 weight % of propylene and 82 weight % of propylene and 15 weight % of talc. The MFR of the blend material was determined to be 15 g/10 min. The resin material 13*m* for the skin material 13 and the resin materials 12*m* and 11*m* for the intermediate layer 12 and base member 11 were separately melted. The melted resin materials 12*m* and 11*m* were first extruded in the form of two layers at a temperature of 110–210° C. from the die-head of the hot-flow extruding machine and placed on the lower molding die 20 in such a manner that the melted resin material 11*m* is brought into contact with the lower molding die 20. Subsequently, the melted resin material 13*m* for the skin material was extruded in the form of a single layer resin sheet at 230° C. from another hot-flow extruding machine and placed on the melted resin material 12*m*. Thereafter, the melted resin materials 13*m*, 12*m* and 11*m* were molded in the same manner as in the example 1 to form a molded multilayer article. The molded multilayer article was composed of the skin material 13 of 0.7 mm in thickness, the intermediate layer 12 of 3.0 mm in thickness and the base member 11 of 2.5 mm in thickness. The hardness of the molded multilayer article measured at its surface side by the method of JIS-S6050 was 68.

(COMPARATIVE EXAMPLE 1)

For preparation of the resin for the skin material 13, 40 weight part of polypropylene the MFR of which is 1.0 g/10 main at 230° C. under load of 2.16 and the melting point of which is 180° C., 30 weight % of ethylene-propylene random copolymer including 67 mol % of ethylene the MFR of which is 0.008 g/10 min at 230° C. under load of 2.16 kg, crystallinity index measured by X-ray is 7.0% and 100 weight part of a composition including 30 weight % of EPDM Grade name EP24) produced by Nippon Gosei Rubber, K.K., the Mooney viscosity of which is 65 and the iodine value of which is 65, were kneaded with addition of 2.0 weight part of crosslinking agent (2,5-dimethyl-2,5-di (T-buthylperoxy)-hexane produced by Kayaku Akzo) and 3.0 weight part of crosslinking agent (TAIC or triarylisocyanurate) by using the bi-axial extruding machine KTX-37 (made of Kobe Seiko, K.K.) to obtain thermoplastic elastomer (TPO). The MFR of the thermoplastic elastomer was 0.01 g/10 in at 230° C., and the shore A hardness was 95. Thus, the thermoplastic elastomer was used to mold a multilayer article in the same manner as in the example 1. The molded multilayer article was composed of the skin material 13 of 2.0 mm in thickness, the intermediate layer 12 of 2.0 mm in thickness and the base member 11 of 2.5 mm in thickness. The foaming rate of the intermediate layer 12 was about 3.0 times, and the hardness of the molded multilayer article measured at its surface side by JIS-S6050 was 97.

(COMPARATIVE EXAMPLE 2)

For preparation of the resin for the skin material 13, a composition consisting of 70 weight % of styrenic thermoplastic elastomer (Taftec H1031 produced by Asahi Kasei) used in the example 1 and 30 weight % of process oil (Diana process oil PW-150 produced by Idemitsu Kosan) was kneaded by the bi-axial extruding machine KTX-37 to obtain a styrenic elastomer composition. The MFR of the styrenic elastomer composition was 250 g/10 min at 230° C., and the shore A hardness was 70. Thus, the styrenic elastomer composition was used to mold a multilayer article in the same manner as in the example 1. Since in this example, the resin for the skin material 13 was adhered to a peripheral portion of the die-head 40, a three-layers resin sheet was not obtained.

(COMPARATIVE EXAMPLE 3)

For preparation of the resin for the skin material 13, a composition consisting of 20 weight % of ethylene propylene random copolymer including 8.8 mol % of ethylene, the MFR of which is 0.5 g/10 min at 230° C. under load of 2.16 kg and the melting point of which is 130° C., 40 weight % of EPDM (Grade name EP 24) produced by Nippon Gosei Rubber K.K., the Mooney viscosity of which is 65 and the iodine value of which is 15, and 40 weight % of process oil (Diana process oil PW-150 produced by Idemitsu Kosan) was kneaded by the extruding machine KTX-37 to obtain thermoplastic elastomer. The MFR of the thermoplastic elastomer was 20 g/10 man at 230° C. and the shore A hardness was 45. Thus, the thermoplastic elastomer was used to mold a multilayer article in the same manner as in the example 1. The molded multilayer article was composed of the skin material 13 of 0.7 mm in thickness, the intermediate layer 12 of 3.5 mm in thickness and the base member 11 of 3.0 mm in thickness. The foaming rate of the intermediate layer 12 was about 5.0 times, and the surface hardness of the molded multilayer article measured by JIS-S6050 was 44.

(COMPARATIVE EXAMPLE 4)

For preparation of the resin for the skin material 13, 60 weight % of polypropylene the MFR of which is 20 g/10 min at 230° C. under load of 2.16 and the melting point of which is 160° C., and a composition including 40 weight % of EPDM (Grade name EP02P) produced by Nippon Gosei Rubber, K.K., the Mooney viscosity of which is 24, were melted and kneaded by the extruding machine KTX-37 to obtain thermoplastic elastomer (TPO). The MFR of the thermoplastic elastomer was 14 g/10 min at 230° C., and the shore A hardness was 99. Thus, the thermoplastic elastomer was used to mold a multilayer article in the same manner as in the example 1. The molded multilayer article was composed of the skin material 13 of 0.7 mm in thickness, the intermediate layer 12 of 3.0 mm in thickness and the base member 11 of 2.5 mm in thickness. The foaming rate of the intermediate layer 12 was about 4.0 times, and the hardness of the molded multilayer article measured at its surface side by JIS-S6050 was 91.

The results of the examples 1 to 4 and the comparative examples 1 to 4 are shown in the following tables 1 and 2, respectively.

TABLE 1

|  | Example 1 | Example 2 | Example 3 | Example 4 |
|---|---|---|---|---|
| Skin material (13) | | | | |
| MFR | 160 | 10 | 0.9 | 10 |
| Shore A hardness | 82 | 69 | 68 | 70 |
| Intermediate layer (12) Foaming rate | 4.3 | 4.7 | 3.5 | 4.1 |
| Base member (11) MFR | 10 | 30 | 7 | 15 |
| Thickness (mm) | | | | |
| Skin material (13) | 0.6 | 0.8 | 1.0 | 0.7 |
| Intermediate layer (12) | 3.0 | 3.7 | 2.5 | 3.0 |
| Base member (11) | 2.5 | 3.0 | 3.0 | 2.5 |
| Surface hardness of article (JIS-6050) | 97 | 58 | 86 | 68 |
| Appearance | Good | Good | Good | Good |

TABLE 2

|  | Example 1 | Example 2 | Example 3 | Example 4 |
|---|---|---|---|---|
| Skin material (13) | | | | |
| MFR | 0.01 | 250 | 20 | 14 |
| Shore A hardness | 95 | 70 | 45 | 99 |

TABLE 2-continued

|  | Example 1 | Example 2 | Example 3 | Example 4 |
|---|---|---|---|---|
| Intermediate layer (12) Foaming rate | 3.0 | — | 5.0 | 4.0 |
| Base member (11) MFR | 10 | 10 | 10 | 10 |
| Thickness (mm) | | | | |
| Skin material (13) | 2.0 | — | 0.7 | 0.7 |
| Intermediate layer (12) | 2.0 | — | 3.5 | 3.0 |
| Base member (11) | 2.5 | — | 3.0 | 2.5 |
| Surface hardness of article (JIS-6050) | 97 | — | 44 | 91 |
| Appearance | Flowmark Difficult of thinning | Irregular pattern | Surface damage | Irregular gloss |

(III) Third preferred embodiment (IIID) Molding method

Figure 7:
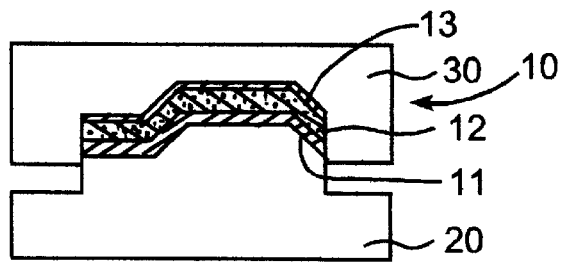
FIG. 7 is a sectional view illustrating a condition in which the melted synthetic resin layers are compressed and cooled in the third embodiment.

In the third preferred embodiment shown in FIGS. 6 and 7, a multilayer article in the form of a door trim board 10 is fabricated by the steps of extruding melted resin layers 13m and 12m respectively forming the skin material 13 and intermediate layer 12 in the form of two layers from a die-head 45 of an extruding machine, supplying the extruded resin layers in such a manner that the resin layer 12m for the intermediate layer is broung into contact with the surface of a base member previously placed on the lower molding die 20, compressing the supplied resin layers by the upper molding die 30 and lifting the upper molding die 30 after cooled the compressed resin layers. The extruding machine used in this embodiment is substantially the same as that in the first embodiment, except for two cylinders provided for the melted resin layers 13m and 12m. In this embodiment, it is preferable that a preformed member of wooden material is used as the base member 11.

In the molding process of the multilayer article, the base member 11 of wooden material is first placed on the lower molding die 20. In this instance, it is desirable that the upper and lower molding dies 30 and 20 are heated for foaming the melted resin layer 12m for the intermediate layer 12. It is also desirable that the base member 11 is preliminarily heated. Subsequently, as shown in FIG. 6(A), the melted resin layers 13m and 12m for the skin material 13 and intermediate layer 12 are extruded in the form of a multilayer resin sheet 15m from the die-head 45 or the extruding machine and placed on the lower molding die 20 in such a manner that the melted resin layer 12m for the intermediate layer 12 is layered on the base member 11. Thereafter, as shown in FIG. 6(B). the upper molding die 30 is moved down and clamped with the lower molding die 20 so that the melted resin layer 12m for the intermediate layer 12 is foamed and that the melted resin layers 12m and 13m are integrally molded with the base member 11 under pressure to form a multilayer article. The temperature of the molding dies 20 and 30 is adjusted in the same manner as in the first embodiment. During the foaming process of the intermediate layer 12, the skin material 13 is formed with an embossment pattern transferred from the upper molding die 30.

(IIIE) Molded multilayer article

The molded multilayer article in the third embodiment is composed of the skin material 13, intermediate layer 12 and base member 11 as in the first embodiment. Each thickness of the skin material 13 and intermediate layer 12 is also the same as that in the first embodiment. The thickness of the base member 11 is determined in accordance with use of the article. The hardness of the molded multilayer article measured at its surface side is the same as that in the first embodiment, and the appearance of the article is formed beautiful by the embossment pattern transferred from the upper molding die as in the first embodiment.

Hereinafter, certain examples of the third embodiment and comparative examples thereof will be described.

(EXAMPLE 5)

An amount of wooden fibers impregnated with 10 weight % of phenol resin was compressed in a heated condition and hardened to form a base member 11. The wooden base member 11 was placed on the lower molding die 20 heated at 200° C. The thickness of base member 11 was 2.5 mm. The resin for the skin material 13 was prepared in the form of styrenic thermoplastic elastomer as in the first embodiment. For preparation of the resin for the intermediate layer 12, 100 weight part of ethylene-maleic anhydride-methyl acrylate copolymer including 2.5 weight % of maleic anhydride and 18 weight % of methyl acrylate, the MFR of which is 10 g/10 min at 190° C. under load of 2.16 kg, was kneaded with 5 weight part of a diazocarbonamide foaming agent (Exceller #25 produced Eiwa Kasei Kogyo). Thus, as shown in FIG. 6(A), the resin materials 13m and 12m for the skin material 13 and intermediate layer 12 were extruded at a temperature of 110–210° C. from the die-head 45 of the extruding machine and supplied to the molding machine in such a manner that the resin material 12m for the intermediate layer 12 is layered on the base member 11. At this stage, the melted resin material 12m for the intermediate layer 12 was slightly foamed.

Subsequently, the upper molding die 30 heated at 130° C. was moved down and clamped with the lower molding die 20. In this instance, the molding dies 20 and 30 were heated for sixty seconds to foam the melted resin material 12m and to emboss a pattern on the surface of the skin material 13. Thereafter, the molding dies 20 and 30 were cooled at 60° C., and then, the upper molding die was lifted to take out the molded multilayer article. As shown in FIGS. 4 and 5, the molded mutilayer article was composed of the skin material 13 of 0.5 mm in thickness, the intermediate layer 12 of 2.8 mm in thickness and the base member 11 of 2.5 mm in thickness. The forming rate of the intermediate layer 12 was about 4.6 times, and the embossment pattern of the upper molding die 30 was clearly transferred to the skin material 13. The multilayer article was molded without causing any useless remainder of the skin material 13 and intermediate layer 12, and the hardness of the molded multilayer article measured at its surface side was 48.

(EXAMPLE 6)

The same wooden base member 11 as that in the example 5 was placed on the lower molding die 20 heated at 180° C. The thickness of the base member 11 was 3.0 mm. The resin for the skin material 13 was prepared in the form of the same thermoplastic elastomer as that in the example 5. For preparation of the resin for the intermediate layer 12, 100 weight part of ethylene-maleic anhydride-methylmethacrylate copolymer including 2.5 weight % of maleic anhydride and 8 weight % of methylmethacrylate, the MFR of which is 8 g/10 min at 190° C. under load of 2.16 kg was kneaded with 2 weight part of diazocarbonamide and 1 weight part of zinc oxide and extruded in the same manner as in the example 5. The resin materials for the skin material 13 and intermediate layer 13 were supplied to the molding machine in such a manner that the resin material for the intermediate layer 12 is layered on the base member 11.

Subsequently, the upper molding die 30 heated at 130° C. was moved down and clamped with the lower molding die 20. In this instance, the molding dies 20 and 30 were heated for seventy seconds to foam the melted resin material 12m and to emboss a pattern on the surface of the skin material 13. Thereafter, the molding dies 20 and 30 were cooled at 60° C., and then, the upper molding die was lifted to take out the molded multilayer article. The molded mutilayer article was composed of the skin material 13 of 0.6 mm in thickness, the intermediate layer 12 of 3.3 mm in thickness and the base member 11 of 3.0 mm in thickness. The foaming rate of the intermediate layer 12 was about 4.8 times, and the embossment pattern of the upper molding die 30 was clearly transferred to the skin material 13. The hardness of the molded multilayer article measured at its surface side was 58.

(EXAMPLE 7)

The same wooden base member 11 as that in the example 5 was placed on the lower molding die 20 heated at 190° C. The thickness of the base member 11 was 3.0 mm. The resin for the skin material 13 was prepared in the form of the same thermoplastic elastomer as that in the example 5. For preparation of the resin for the intermediate layer 12, 100 weight part of ethylene-maleic anhydride-methylacrylate copolymer including 3.0 weight % of maleic anhydride and 19 weight % of methylacrylate, the MFR of which is 10 g/10 min at 190° C. under load of 2.16 kg was kneaded with 5 weight part of diazocarbonamide, 1.5 weight part of zinc oxide and 1.4 weight part of trimethylolpropane and extruded in the same manner as in the example 5. The resin materials for the skin material 13 and intermediate layer 12 were supplied to the molding machine in such a manner that the resin material for the intermediate layer 12 is layered on the base member 11.

Subsequently, the upper molding die 30 heated at 110° C. to 130° C. was moved down and clamped with the lower molding die 20. In this instance, the molding dies 20 and 30 were heated for fifty seconds to foam the melted resin material 12m and to emboss a pattern on the surface of the skin material 13. Thereafter, the molding dies 20 and 30 were cooled at 70° C. and then, the upper molding die was lifted to take out the molded multilayer article. During lapse of the fifty seconds, the upper molding die 30 was lifted by 1 mm for the last twenty seconds to expand the clearance in the clamped molding dies. The molded mutilayer article was composed of the skin material 13 of 0.8 mm in thickness, the intermediate layer 12 of 2.8 mm in thickness and the base member 11 of 3.0 mm in thickness. The foaming rate of the intermediate layer 12 was about 3.6 times, and the embossment pattern of the upper molding die 30 was clearly transferred to the skin material 13. The hardness of the molded multilayer article measured at its surface side was 82.

(EXAMPLE 8)

The same wooden base member 11 as that in the example 5 was placed on the lower molding die 20 heated at 170° C. The thickness of the base member 11 was 2.5 mm.

For preparation of the resin for the skin material 13, 40 weight % of polypropylene the MFR of which is 1.0 g/10 min at 230° C. under load of 2.16 and the melting point of which is 160° C., and 100 weight part of a composition consisting 40 weight part of ethylene propylene random copolymer including 67% mol of ethylene, the MFR of which is 0.008 g/10 min at 230° C. under load of 2.16 kg and the crystallized grade of which is 7.0%, 20 weight part of EPDM (Grade name EP24) produced by Nippon Gosei Rubber, K.K., the Mooney viscosity of which is 65 and the iodine value of which is 15, and 25 weight part of process oil (Diana proc ess oil PW-150 produced by Idemitsu Kosan) were added with 2.0 weight part of a crosslinking agent (2,5-dimethyl-2,5-de(T-buthylperoxy)hexane produced by Kayaku Akzo) and 3.0 weight part of a crosslinking helper (triarylisocyanurate) were kneaded by the bi-axial extruding machine KTX of Kobe Seiko, K.K. to obtain thermoplastic elastomer. The MFR of the thermoplastic elastomer was 0.4 g/10 min at 230° C. under load of 2.16 kg, and the shore A hardness was 84. For preparation of the resin for the intermediate layer 12, 100 weight part of ethylene-maleic anhydride-buthylacrylate copolymer including 2.5 weight % of maleic anhydride and 16 weight % of buthylacrylate, the MFR of which is 7 g/10 min at 190° C. under load of 2.16 kg, was kneaded with 7 weight part of diazocarbonamide and 4.2 weight part of copolymer of ethylene and 2-hydroxyethylacrylate and extruded in the same manner as in the example 5.

Thus, the resin materials for the skin material 13 and intermediate layer 12 were supplied to the molding machine in such a manner that the resin material 12m for the intermediate layer is layered on the base member 11. Subsequently, the upper molding die 30 heated at a temperature of 120° C. to 130° ° C. was moved down and clamped with the lower molding die 20. In this instance, the molding dies 20 and 30 were heated for ninety seconds to foam the melted resin material 12m for the intermediate layer 12 and to emboss a pattern on the surface of the skin material 13. Thereafter, the molding dies 20 and 30 were cooled at 70° C., and then, the upper molding die was lifted to take out the molded multilayer article. During lapse of the ninety seconds, the upper molding die 30 was lifted by 1 mm for the last twenty seconds to expand the clearance in the clamped molding dies. The molded mutilayer article was composed of the skin material 13 of 0.7 mm in thickness, the intermediate layer 12 of 2.8 mm in thickness and the base member 11 of 2.5 mm in thickness. The foaming rate of the intermediate layer 12 was about 4.0 times, and the embossment pattern of the upper molding die 30 was clearly transferred to the skin material 13. The hardness of the molded multilayer article measured at its surface side was 67.

(EXAMPLE 9)

The resin for the intermediate layer 12 prepared in the example 8 was further added with 0.5 weight part of azoisobuthylnitryl and molded in the same manner as in the example 8. The molded multilayer article was composed of the skin material 13 of 0.7 mm in thickness, the intermediate layer 12 of 2.9 mm in thickness and the base member of 2.5 mm in thickness. The foaming rate of the intermediate layer 12 was 4.5 times, and the hardness of the molded multilayer article measured at its surface side was 60.

(COMPARATIVE EXAMPLE 5)

The upper and lower molding dies 30 and 20 were heated at 40° C. to mold a multilayer article in the same manner as in the example 5. The molded multilayer article was composed of the skin material 13 of 0.5 mm in thickness, the intermediate layer 12 of 0.6 mm in thickness and the base member 11 of 2.5 mm in thickness. The foaming rate of the intermediate layer 12 was about 1.1 times, and the hardness of the molded multilayer article measured at its surface side was 98.

(COMPARATIVE EXAMPLE 6)

The resin for the skin material 13 was prepared in the form of the same thermoplastic elastomer as that of the comparative example 1 and used to mold a multilayer article in the same manner as in the example 5. The molded multilayer article was composed of the skin material 13 of 1.6 mm in thickness, the intermediate layer 12 of 2.5 mm in thickness and the base member 11 or 2.5 mm in thickness. The foaming rate of the intermediate layer 12 was about 3.0 times, and the hardness of the molded multilayer article measured at its surface side was 95.

(COMPARATIVE EXAMPLE 7)

The resin for the skin material 13 was prepared in the form of the same thermoplastic elastomer as that of the comparative example 2 and used to mold a multilayer article in the same manner as in the example 5. In this example, the resin materials 13m and 12m for the skin material 13 and intermediate layer 12 were mixed. As a result, a resin sheet of two layers was not obtained due to droop of the resin sheet.

(COMPARATIVE EXAMPLE 8)

The resin for the skin material 13 was prepared in the form of the same thermoplastic elastomer as that of the comparative example 3 and used to mold a multilayer article in the same manner as in the example 5. The molded multilayer article was composed of the skin material 13 of 0.6 mm in thickness, the intermediate layer 12 of 2.8 mm in thickness and the base member 11 of 2.5 mm in thickness. The foaming rate of the intermediate layer 12 was about 4.5 times, and the hardness of the molded multilayer article measured at its surface side was 43.

(COMPARATIVE EXAMPLE 9)

The resin for the skin material 13 was prepared in the form of the thermoplastic elastomer as that of the comparative example 4 and used to mold a multilayer article in the same manner as in the example 5.

The molded multilayer article was composed of the skin material 13 of 1.0 mm in thickness, the intermediate layer 12 of 2.7 mm in thickness and the base member 11 of 3.0 mm in thickness. The foaming rate of the intermediate layer 12 was about 3.8 times, and the hardness of the molded multilayer article measured at its surface side was 96.

The results of the examples 5 to 8 and the comparative examples 5 to 8 are shown in the following tables 3 and 4, respectively.

TABLE 3

|  | Example 1 | Example 2 | Example 3 | Example 4 | Example 4 |
|---|---|---|---|---|---|
| Skin material (13) |  |  |  |  |  |
| MFR | 160 | 10 | 10 | 0.4 | 0.4 |
| Shore A hardness | 82 | 69 | 69 | 84 | 84 |
| Intermediate layer (12) Foaming rate | 4.6 | 4.8 | 3.6 | 4.0 | 4.5 |
| Adhesive strength (12)/(11) kg/25 mm Thickness (mm) | 2.8 | 2.7 | 3.1 | 2.9 | 3.0 |
| Skin material (13) | 0.5 | 0.6 | 0.8 | 0.7 | 0.7 |
| Intermediate layer (12) | 2.8 | 3.3 | 2.8 | 2.8 | 2.9 |

TABLE 3-continued

|  | Example 1 | Example 2 | Example 3 | Example 4 | Example 4 |
|---|---|---|---|---|---|
| Base member (11) | 2.5 | 3.0 | 3.0 | 2.5 | 2.5 |
| Surface hardness of article (JIS 6050) | 48 | 58 | 82 | 67 | 60 |
| Appearance | Good | Good | Good | Good | Good |

TABLE 4

|  | Example 1 | Example 2 | Example 3 | Example 4 | Example 4 |
|---|---|---|---|---|---|
| Skin material (13) |  |  |  |  |  |
| MFR | 160 | 0.01 | 250 | 20 | 14 |
| Shore A hardness | 82 | 95 | 70 | 45 | 99 |
| Intermediate layer (12) Foaming rate | 1.1 | 3.0 | — | 4.5 | 3.8 |
| Adhesive strength (12)/(11) kg/25 mm | 0.8 | 2.7 | — | 2.9 | 2.8 |
| Thickness (mm) |  |  |  |  |  |
| Skin material (13) | 0.5 | 1.6 | — | 0.6 | 1.0 |
| Intermediate layer (12) | 0.6 | 2.5 | — | 2.8 | 2.7 |
| Base member (11) | 2.5 | 2.5 | — | 2.5 | 3.0 |
| Surface hardness of article (JIS-6050) | 98 | 95 | — | 43 | 96 |
| Appearance | Deffect of cushion | Flowmark Difficult of thinning | — | Surface damage | Irregular gloss |

(IV) Fourth preferred embodiment

First of all, a molding machine used in this embodiment will be described with reference to FIGS. 8 to 11. The molding machine comprises a lower molding die 20 mounted on a support bed (not shown) and an upper molding die 30 mounted to an upper movable support member (not shown). The lower molding die 20 is formed thereon with a first molding surface which corresponds with the bottom surface of a base member for a multilayer article in the form of a door trim board 10 and is formed at its outer periphery with an outward stepped portion 20b which corresponds with an outer contour of the door trim board 10. The lower molding die 20 is formed therein with a suction passage 21 and a number of branch passages 21a in open communication with the suction passage 21. The branch passages 21a are opened at the first molding surface 20a of mold die 20, and the suction passage 21 is connected to a vacuum source 22 composed of a vacuum pump, a vacuum tank and a on-off valve (not shown).

Figure 8:
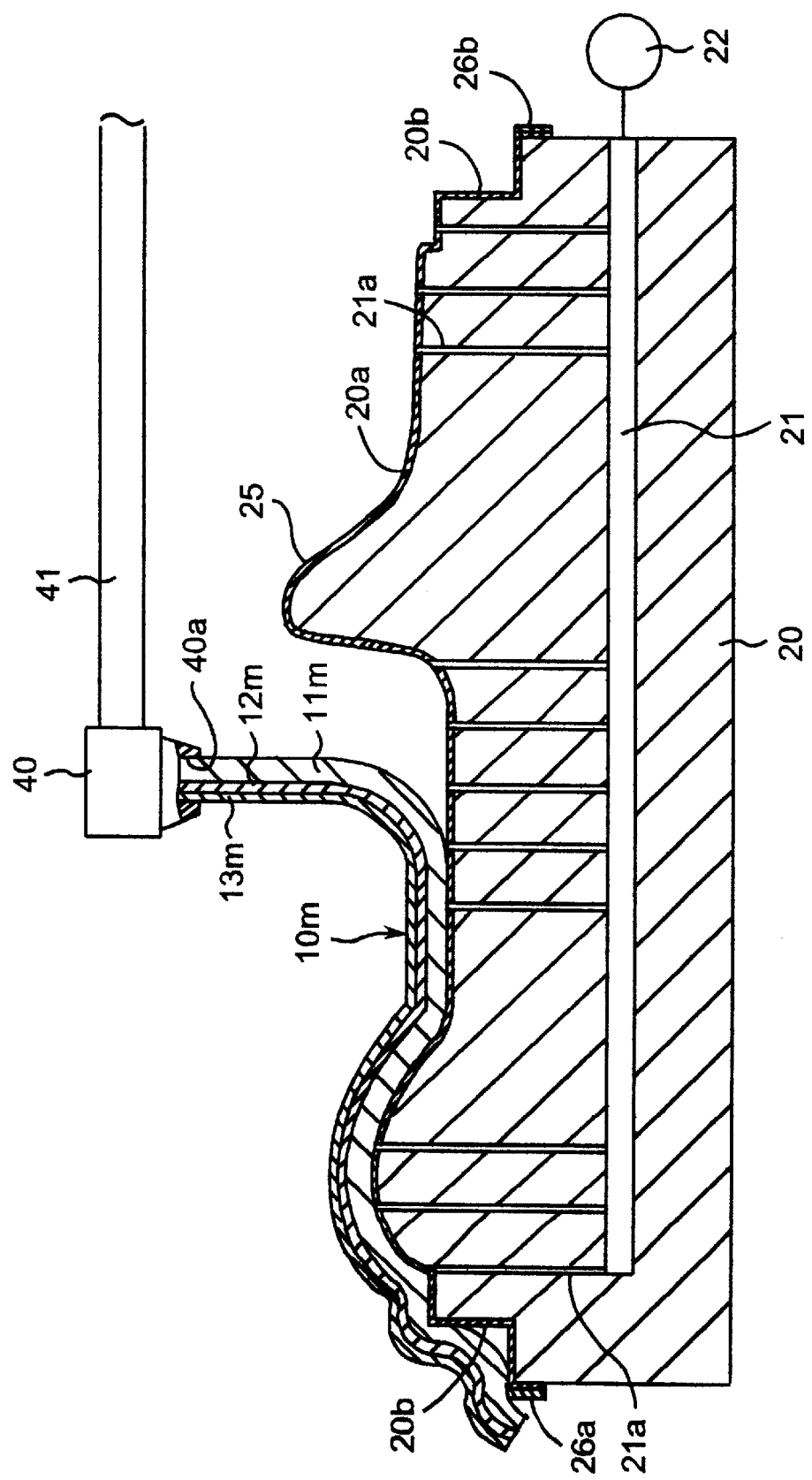
FIG. 8 is a sectional view illustrating a condition in which melted synthetic resin layers are being supplied to a molding machine in a fourth embodiment of a manufacturing method of a multilayer article in accordance with the present invention.
Figure 9:
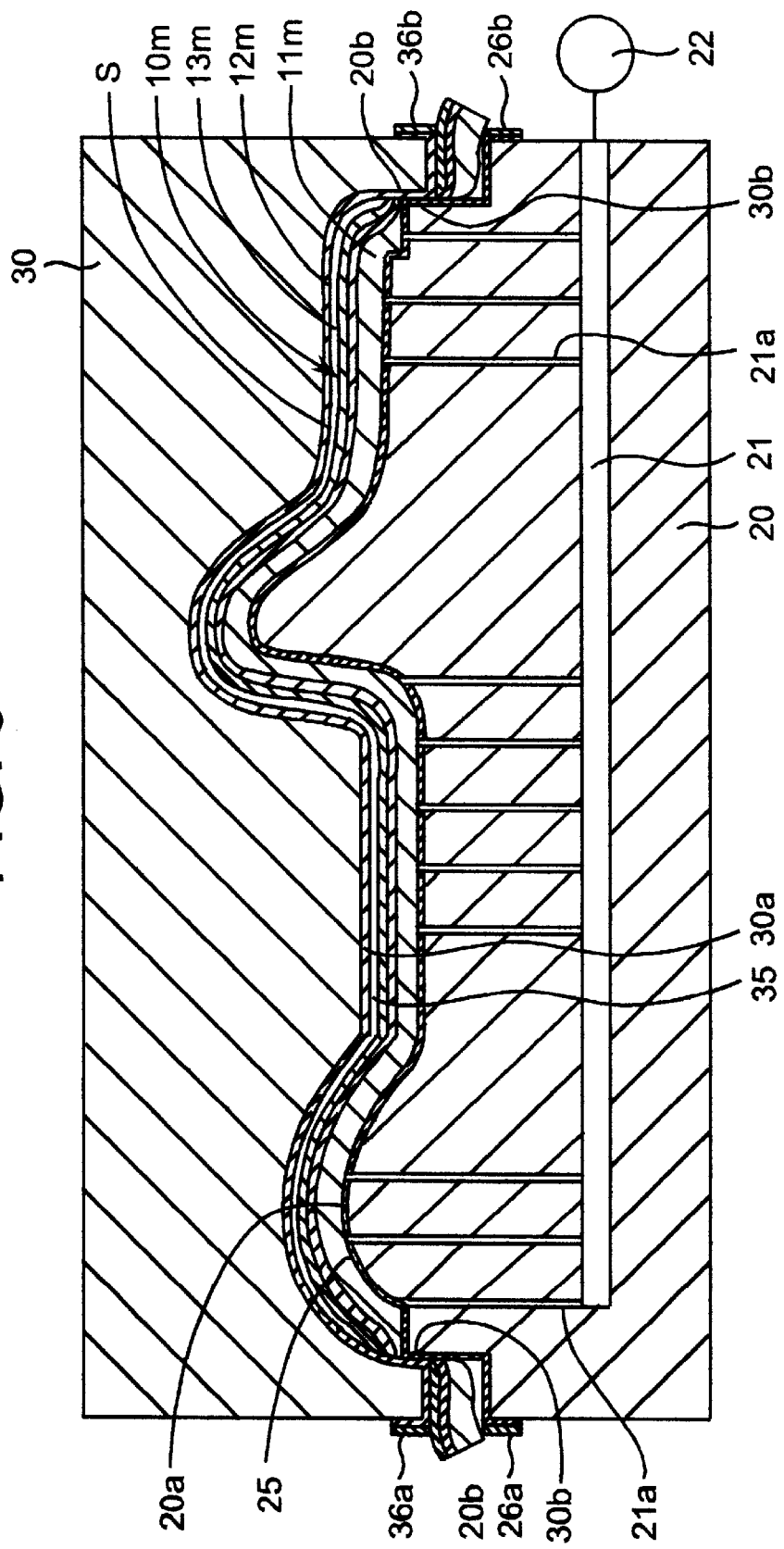
FIG. 9 is a sectional view illustrated a condition in which the molding dies have been clamped in the fourth embodiment.
Figure 10:
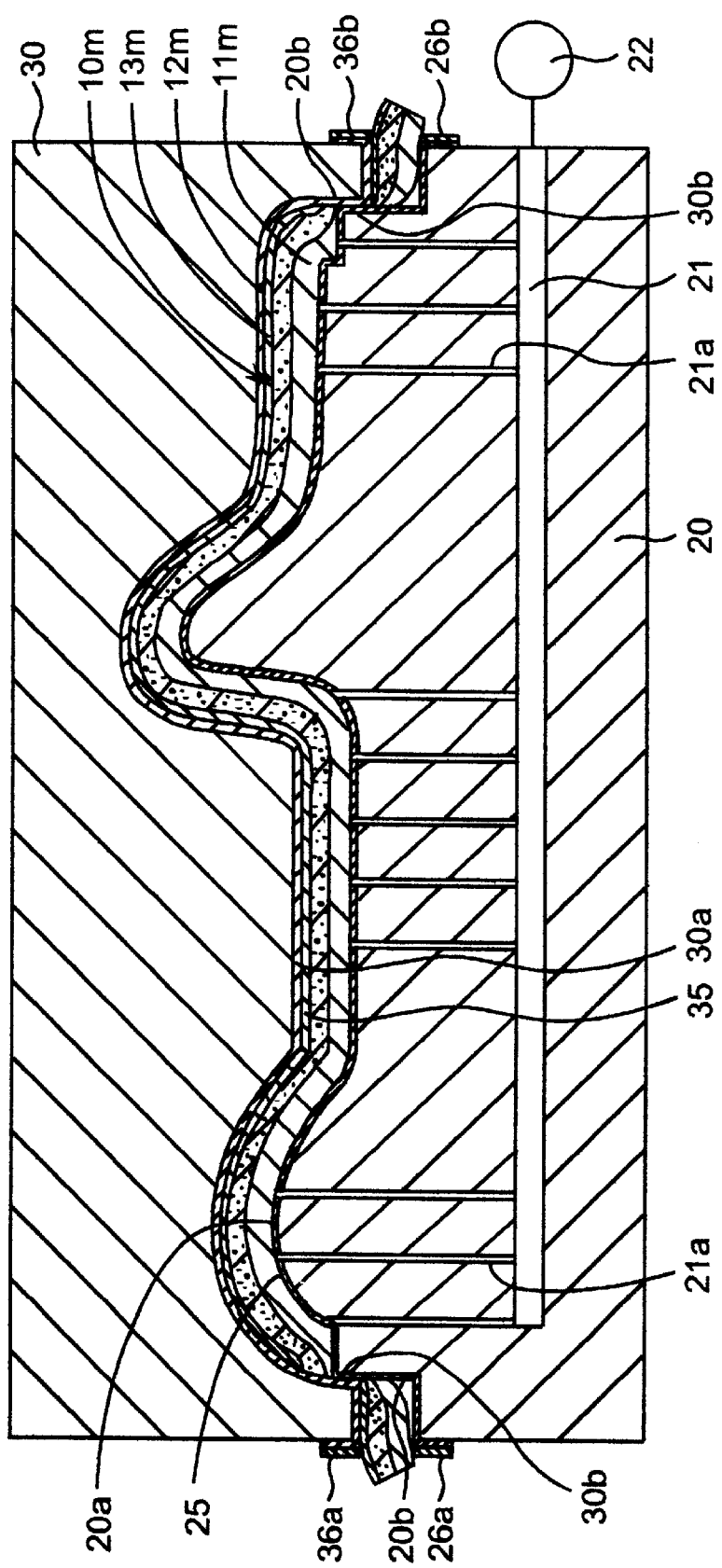
FIG. 10 is a sectional view illustrating a condition in which a foaming process has finished in the fourth embodiment.

The upper molding die 30 is arranged to be moved toward and away from the lower molding die 20. Illustrated in FIG. 8 is only the lower molding die 20 in a condition where the upper molding die 30 is separated therefrom. In FIGS. 9 and 10 there is illustrated a condition where the upper molding die 30 has been moved down toward the lower molding die 20. The upper molding die 30 is formed with a second molding surface 30a which corresponds with the surface of the skin material 13. The upper molding die 30 is formed at its outer periphery with an inward stepped portion 30b which is located as shown in FIGS. 9 and 10 to be coupled with the outward stepped portion 20b of lower molding die 20 with a slight clearance.

The lower molding die 20 is provided at the first molding surface 20a and outward stepped portion thereof with a surface heater 25 in the form of a thin membrane which is provided at its opposite sides with electrodes 26a and 26b for connection to an electric power source. Similarly, the upper molding die 30 is provided at the second molding surface 30a and inward stepped portion 30b thereof with a surface heater 35 which is provided at its opposite ends with electrodes 36a and 36b. The surface heaters 25 and 35 each are composed of an insulation layer and a resistance layer. As shown in FIG. 11, the surface heater 35 includes an insulation layer 35a in the form of a thin ceramic membrane formed on the second molding surface 30a and inward stepped portion 30b and a resistance layer in the form of a thin membrane of nitride titanium (for example, in thickness of five microns) formed on the insulation layer 35. The electrodes 36a and 36b are provided on the resistance layer 35b at the lower side portions of upper molding die 30. The insulation layer 35a is formed with an embossment pattern 37 at a portion where the skin material 13 of the door trim board 10 is formed, except for the periphery of the surface heater 35, and the resistance layer 35b is also formed with the embossment pattern 37. The surface heater 25 of the lower molding die 20 is provided substantially in the same construction as that of the surface heater 35 without forming any embossment pattern.

As shown in FIG. 8, the molding machine is provided with a die-head 40 which is arranged to be extended above the lower molding die 20 in a condition where the upper molding die 30 is retained in an upward position. The die-head 40 is connected to three resin supply conduits 41 to be supplied with semi-melted resin materials for the intermediate layer 12 and skin material 13 therethrough. Illustrated in the figure is one of the resin supply conduits 41. The resin materials for the base member 11, intermediate layer 12 and skin material 13 are the same as those used in the first embodiment.

(IVD) Molding method

In the fourth embodiment, the molding dies 20 and 30 are used at a room temperature (for instance, 20° C.) at start of the manufacturing. Daring a supply process of resin materials, the upper molding die 30 is retained in the upward position, and the resin materials supplied from the resin supply conduits 41 in a semi-melted condition (at a temperature of 110° C. to 210° C.) are integrally layered with each other in the die-head 40 and extruded in the form of a multilayer resin sheet 10m from extrusion slits 40a of the die-head 40. In this instance, the multilayer resin sheet 10m is composed of the semi-melted resin materials 11m, 12m and 13m for the base member 11, intermediate layer 12 and skin material 13 and is extruded in a predetermined width. For fabrication of a door trim board of about 600 mm×900 mm, the melted resin layers 11m, 12m and 13m are extruded in thickness of 2.5 mm, 0.5 mm and 0.5 mm respectively, and the multilayer resin sheet 10m is formed to be 800–850 mm in width slightly smaller than the width of the door trim board 10. While the melted resin layers 11m, 12m and 13 are extruded in the form of the multilayer resin sheet 10m, the die-head 40 is moved in a horizontal direction perpendicular to the extrusion slits 40a. In this instance, the multilayer resin sheet 10m is placed on the lower molding die 20 in such a manner that the resin layer 11m for the base member 11 is placed on the first molding surface 20a and outward stepped portion 20b of the lower molding die 20. Thus, as shown partially in FIG. 8, the multilayer resin sheet 10m is formed along the first molding surface 20a and brought into contact with the outward stepped portion 20b at its outer periphery.

During a vacuum suction process carried out after the resin supply process, the multilayer resin sheet 10m is sucked by a negative pressure applied from the vacuum source 22 through the suction passage 21 and branch passages 21a in the lower molding die 20. Since the outer periphery of the multilayer resin sheet 10m is maintained in contact with the outward stepped portion 20b of lower molding die 20, the multilayer resin sheet 10m is pressed into contact with the surface heater 25 and outward stepped portion 20b of the lower molding die 20 by suction pressure applied thereto, while the die-head 40 is completely retracted during the suction process.

In the following die-clamping process, the upper molding die 30 is moved down toward the lower molding die 20 and positioned slightly above the lower molding die 20 to form a predetermined clearance between the first and second molding surfaces 20a and 30a. At this stage, as shown in FIG. 9, the second molding surface 30a is spaced in a predetermined small distance S (for example, 1.5 mm) from the surface of the semi-melted resin layer 13m for the skin material 13. When the inward stepped portion 30b of upper molding die 30 is coupled with the outward stepped portion 20b of lower molding die 20, a useless remainder of the multilayer resin sheet 10m is cut out by shearing action of the stepped portions 20b and 30b. Since the width of the multilayer resin sheet 10m is slightly smaller than the width of the door trim board 10, a small space is formed between the opposite sides of the multilayer resin sheet 10m and the inward stepped portion 30b of upper molding die 30.

In the following foaming process, the surface heaters 25 and 35 are energized by voltage applied to the electrodes 26a, 26b and 36a, 36b to rapidly heat the first and second molding surfaces 20a and 30a (for instance, at 130° C.) so that the melted resin layer 12m for the intermediate layer 12 is foamed by inert gas such as nitrogen gas caused by thermal decomposition of the foaming agent contained therein. As a result, the intermediate resin layer 12m is expanded to reduce the space S between the second molding surface 30a and the surface of the melted skin resin layer 13m. After 40–60 seconds, the surface of the melted skin resin layer 13m is pressed into contact with the second molding surface 30a as shown in FIG. 10, and the space between the opposite sides of the multilayer resin sheet 10m and the inward stepped portion 30b is impregnated with the melted resin layers 11m, 12m and 13m. Thus, the embossment pattern of the second molding surface 30a is transferred to the surface of the skin resin layer 13m under the foaming pressure (for instance, 0.5 kgf/cm$^2$) of the intermediate resin layer 12m and the heat applied from the second molding surface 30a. Since the space formed at the opposite sides of the multilayer resin sheet 10m is noticeably small relative to the whole volume of the door trim board 10, the deformation rate of the multilayer resin sheet 10m caused by impregnation into the space is small. Thus, the multilayer resin sheet 10m is kept in three layers in the space without causing any protrusion of the intermediate resin layer 12m.

In the following cooling process, the temperature of the molding surfaces 20a and 30a is rapidly decreased by heat transmission to the molding dies 20 and 30 after deenergization of the surface heaters 25 and 35. When the temperature of the molding surfaces 20a and 30a decreases to about 40° C., the melted resin layers 11m, 12m and 13 are hardened in the form of a door trim board 10. At this stage, the upper molding die is lifted to take out the molded door trim board 10. Subsequently, the die-head 40 is extended to be located above the lower molding die 20 to extrude the semi-melted multilayer resin sheet 10m in the same manner as described above for fabricating the following door trim board.

(IVE) Molded multilayer article

The molded multilayer article in the fourth embodiment is substantially the same as that in the second embodiment.

(IVF) Useful effect

Although in the fourth embodiment, the base member 11 is rigid, the elastic skin material 13 made of thermoplastic elastomer is formed on the base member 11 through the foamed elastic intermediate layer 12. This is useful to provide the door trim board 10 with soft feel. Since the base member 11, intermediate layer 12 and skin material 13 are simultaneously molded in the molding machine, the manufacturing cost of the door trim board 10 can be reduced. As the semi-melted resin materials for the base member 11, intermediate layer 12 and skin material 13 are extruded in the form of a multilayer resin sheet from the die-head 40 and supplied to the molding machine, the base member 11, intermediate layer 12 and skin material 13 of the door trim board 10 are integrally formed without causing any separation. As the multilayer resin sheet 10m is formed smaller in width than the door trim board 10, an amount of the remainders cut out in the die-clamping process becomes small.

Since in the fourth embodiment the multilayer resin sheet 10m is pressed into contact with the first molding surface 20a of lower molding die 20 during the vacuum suction process so that the melted resin layer 13m for the skin material 13 is spaced from the second molding surface 30a of upper molding die 30 during the die-clamping process, the occurrence of irregularity in thickness of the base member 11, intermediate layer 12 and skin material 13 can be avoided.

Although in the fourth embodiment, the intermediate resin layer 12 was foamed by heat applied from the surface heaters 25 and 35 on the first and second molding surfaces 20a and 30a, the intermediate resin layer 12 may be foamed by heat applied only from the surface heater 35 on the second molding surface 30a. Alternatively, the first and second molding surfaces 20a and 30a may be heated by heated vapor applied thereto from passages formed in the lower molding die 20 adjacent thereto and cooled by cold air applied from the passages.

(V) Fifth preferred embodiment

In the fifth preferred embodiment illustrated in FIGS. 12 to 14, a preliminarily molded rigid base member 11 is used to form an intermediate layer 12 and a skin material 11 integrally thereon as in the third embodiment. In this embodiment, the same base member 11 as that of the third embodiment is used. The molding machine used in this embodiment is substantially the same as that in the fourth embodiment, provided that the surface heater 25 is removed from the first molding surface 20a and outward stepped portion 20b of the lower molding die 20 and that the melted resin layers for the intermediate layer and skin material are extruded in the form of a multilayer resin sheet 15m superior in plasticity from a die-head 45 of the molding machine.

(VD) Molding method

In the fifth embodiment, the preliminarily molded base member 11 is placed on the lower molding die 20 at a room temperature as in the fourth embodiment in a condition where the upper molding die 30 is retained in the upward position. In the following process for supply of the resin materials, as shown in FIG. 12, the resin materials 12m, 13m for the intermediate layer 12 and skin material 13 supplied into the die-head 41 from the resin supply conduits 41 in a semi-melted condition are integrally layered with each other and extruded in the form of a multilayer resin sheet 15m from the extrusion slits 45a of the die-head 45. The size and temperature of the multilayer resin sheet are the same as those in the fourth embodiment. Thus, the multilayer resin sheet 15m is supplied to the molding machine in such a manner that the base member 11 and an upper outer periphery of the lower molding die 20 are fully covered with the resin layer 12m for the intermediate layer 12. As a result, the outer peripheral portion of the multilayer resin sheet 15m is retained in contact with the outward stepped portion 20b of lower molding die 20 as in the fourth embodiment.

In the following vacuum suction process, the multilayer resin sheet 15m is sucked by negative pressure applied from the vacuum source 22 through the passages 21a in the lower molding die 20 and the base member 11. Thus, the multilayer resin sheet 15m is pressed into contact with the surface of the base member 11 and the outward stepped portion 20b of lower molding die 20. In the following die-clamping process, the upper molding die 30 is moved down toward the lower molding die 20 and positioned slightly above the lower molding die 20 as in the fourth embodiment. (see FIG. 13) During the die-clamping process, a useless remainder portion of the multilayer resin sheet 15m protruded outwardly from the molding dies is cut out by shearing action of the stepped portions 20b and 30b coupled to one another.

In the following foaming process, the surface heater 35 is energized by voltage applied to the electrodes 36a, 36b to rapidly heat the second molding surface 30a of upper molding die 30 (for instance, at 130° C.) so that the melted resin layer for the intermediate layer 12 is foamed. After lapse of 40 to 60 seconds, the surface of the skin resin layer 13m is pressed into contact with the second molding surface 30a as shown in FIG. 14, and the space between the opposite sides of the multilayer resin sheet 15m and the inward stepped portion 30b of upper molding die 30 is impregnated with the melted resin layers 12m and 13m. Thus, the embossment pattern of the second molding surface 30a is transferred to the surface of the skin resin layer 13m as in the fourth embodiment, and the multilayer resin sheet 15m is kept in the space without causing any protrusion of the intermediate resin layer 12m.

In the following cooling process, the temperature of the second molding surface 30a is rapidly decreased by deenergization of the surface heater 35. When the temperature of the second molding surface 35 decreases to about 40° C., the melted resin layers 12m and 13m are hardened in the form of a door trim board 10 composed of the porous base member 11, intermediate layer 12 and skin material 13. At this stage, the upper molding die 30 is lifted to take out the molded door trim board 10 from the molding machine.

(VE) Molded multilayer article

The molded multilayer article in the fifth embodiment is substantially the same as that in the third embodiment.

(VF) Useful effect

Although in the fifth embodiment, the base member 11 is rigid, the elastic skin material 13 made of thermoplastic elastomer is formed in the base member 11 through the foamed elastic intermediate layer 12. This is useful to provide the door trim board with a soft feel. Since the base member 11, intermediate layer 12 and skin material 13 are simultaneously molded in the molding machine, the manufacturing cost of the door trim board 10 can be reduced. As the semi-melted resin materials for the base member 11, intermediate layer 12 and skin material 13 are extruded in the form of a multilayer resin sheet from the die-head and supplied to the molding machine, the intermediate layer 12 is impregnated into the surface of the porous base member 11 and bonded thereto by an anchor effect. Thus, the base member 11, intermediate layer 12 and skin material 13 of the door trim board 10 are integrally formed without causing any separation thereof.

Although in the fifth embodiment the base member 11 is made of a wooden material, the base member 11 may be made of synthetic resin. In such a case, it is preferable that the base member 11 is formed with a number of vent holes or a number of small grooves or recesses at the surface in contact with the intermediate layer 12 to discharge the air trapped in a space between the base member 11 and intermediate layer 12.

We claim:

1. A manufacturing method of a multilayer article composed of a soft skin material, a foamed intermediate layer and a base member, said method comprising the steps of:

extruding a melted resin layer for the skin material, a melted resin layer for the intermediate layer containing a foaming agent and a melted resin layer for the base member in the form of a multilayer resin sheet from a die-head of an extruding machine having extrusion slits on a lower molding die of a molding machine in such a manner that the melted resin layer for the base member is placed on the lower molding die of the molding machine while the die-head is being moved in a horizontal direction perpendicular to the extrusion slits; and moving down a pre-heated upper molding die of the molding machine and clamping the upper molding die with the lower molding die to foam the resin layer and to mold the extruded resin layers under pressure in a multilayer article.

2. The manufacturing method of the multilayer article as set forth in claim 1, wherein the resin layer for the skin material consists of thermoplastic elastomer, the resin layer for the intermediate layer consists of ethylenic copolymer copolymerized with ethylene and at least radical polymerizable acid anhydride and including the foaming agent, and the resin layer for the base member consists of olefinic resin.

3. The manufacturing method of the multilayer article as set forth in claim 2, wherein the thermoplastic elastomer is olefinic thermoplastic elastomer and/or styrenic thermoplastic elastomer.

4. The manufacturing method of the multilayer article as set forth in claim 2, wherein the thermoplastic elastomer has a melting flow rate of 0.1–200 g/10 min at 230° C. under load of 2.16 kg and a shore A hardness in a range of 50–96.

5. The manufacturing method of the multilayer article as set forth in claim 1, wherein the melted resin layers for the skin material, intermediate layer and base member are layered in the interior of the die-head of said extruding machine and extruded in the form of a multilayer resin sheet from the die-head.

6. The manufacturing method of the multilayer article as set forth in claim 1, wherein the melted resin layer for the base member is extruded in the form of a single layer sheet from the die-head of said extruding machine, and wherein the melted resin layers for the skin material and intermediate layer are layered in the interior of the die-head of said extruding machine and layered on the extruded resin layer for the base member after being extruded in the form of a multilayer resin sheet from the die-head.

7. A manufacturing method of a multilayer article composed of a soft skin material, a foamed intermediate layer and a base member, said method comprising the steps of:

extruding a melted resin layer for the skin material, a melted resin layer for the intermediate layer containing a foaming agent and a melted resin layer for the base member in the form of a multilayer resin sheet from a die-head of an extruding machine on a lower molding die of a molding machine in such a manner that the melted resin layer for the base member is placed on the lower molding die of the molding machine while the die-head is being moved in a horizontal direction; and moving down a pre-heated upper molding die of the molding machine and clamping the upper molding die with the lower molding die to foam the resin layer for the intermediate layer and to mold the extruded resin layers under pressure in a multilayer article, wherein the melted resin layers for the intermediate layer and base member are extruded in the form of a multilayer resin sheet from the die-head of said extruding machine, and wherein the melted resin layer for the skin material is layered on the extruded resin layer for the intermediate layer after being extruded in the form of a single layer sheet from the die-head of said molding machine.

8. A manufacturing method of a multilayer article composed of a soft skin material, a foamed intermediate layer and a rigid base member, said method comprising the steps of:

setting a preliminarily molded rigid base member on a lower molding die of a molding machine;

extruding a melted resin layer for the skin material and a melted resin layer for the intermediate layer containing a foaming agent in the form of a multilayer resin sheet from a die-head of an extruding machine having extrusion slits on the lower molding die in such a manner that the resin layer for intermediate layer is layered on the rigid base member while the die-head is being moved in a horizontal direction perpendicular;

clamping a heated upper molding die with the lower molding die of said molding machine to foam the resin layer for the intermediate layer and to mold the resin layers for the skin material and intermediate layer integrally with the rigid base member; and cooling the molding dies of said molding machine.

9. The manufacturing method of the multilayer article as set forth in claim 8, wherein the resin layer for the skin material consists of thermoplastic elastomer, the resin layer for the intermediate layer consists of ethylenic copolymer copolymerized with ethylene and at least radical copolymerizable acid anhydride and including the foaming agent, and the rigid base member is made of a wooden material.

10. The manufacturing method of the multilayer article as set forth in claim 9, wherein the thermoplastic elastomer is olefinic thermoplastic elastomer and/or styrenic thermoplastic elastomer.

11. The manufacturing method of the multilayer article as set forth in claim 9, wherein the thermoplastic elastomer has a melting flow rate of 0.1–200 g/10 min at 230° C. under load of 2.16 kg and a shore A hardness in a range of 50–96.

12. A manufacturing method of a multilayer article composed of a rigid base member, a foamed soft intermediate layer layered on the base member and a soft skin material layered on the intermediate layer, said method comprising the steps of:

extruding a melted resin layer for the base member, a melted resin layer for the intermediate layer including a foaming agent and a melted resin layer for the skin material in the form of a multilayer resin sheet from a die-head of an extruding machine having extrusion slits on a lower molding die of a molding machine in such a manner that the resin layer for the base member is placed on a first molding surface formed on the lower molding die of said molding machine while the die-head of said extruding machine is being moved in a horizontal direction perpendicular to the extrusion slits;

moving down an upper molding die formed with a second molding surface corresponding with the surface of the skin material and clamping the upper molding die with the lower molding die in a manner such that the upper molding die is positioned to form a clearance between the first and second molding surfaces larger than the thickness of the multilayer resin sheet;

heating the upper molding die to foam the resin layer for the intermediate layer including the foaming agent until the surface of the resin layer for the skin material is pressed into contact with the second molding surface; and cooling the melted resin layers for the base member, intermediate layer and skin material.

13. The manufacturing method of the multilayer article as set forth in claim 12, wherein the resin layer for the skin material consists of thermoplastic elastomer, the resin layer for the intermediate layer consists of ethylenic copolymer copolymerized with ethylene and at least radical copolymerizable acid anhydride and including the foaming agent, and the resin layer for the base member consists of olefinic resin.

14. The manufacturing method of the multilayer article as set forth in claim 13, wherein the thermoplastic elastomer is olefinic thermoplastic elastomer and/or styrenic thermoplastic elastomer.

15. The manufacturing method of the multilayer article as set forth in claim 13, wherein the thermoplastic elastomer has a melting flow rate of 0.01–200 g/10 min at 230° C. under load of 2.16 kg and a shore A hardness in a range of 50–96.

16. The manufacturing method of the multilayer article as set forth in claim 12, wherein a useless remainder portion of the resin layer for the base member is pressed into contact with the first molding surface of the lower molding die under vacuum.

17. The manufacturing method of the multilayer article as set forth in claim 12, wherein a useless remainder portion of the multilayer resin sheet protruded outwardly from the first molding surface of the lower molding die is cut out during the clamping process of the molding dies.

18. A manufacturing method of a multilayer article composed of a rigid base member, a foamed soft intermediate layer layered on the base member and a soft skin material layered on the intermediate layer, said method comprising the steps of:

extruding a melted resin layer for the base member, a melted resin layer for the intermediate layer including a foaming agent and a melted resin layer for the skin material in the form of a multilayer resin sheet from a die-head of an extruding machine on a lower molding die of a molding machine in such a manner that the resin layer for the base member is placed on a first molding surface formed on the lower molding die of said molding machine while the die-head of said extruding machine is being moved in a horizontal direction;

moving down an upper molding die formed with a second molding surface corresponding with the surface of the skin material and clamping the upper molding die with the lower molding die in a manner such that the upper molding die is positioned to form a clearance between the first and second molding surfaces larger than the thickness of the multilayer resin sheet;

heating the upper molding die to foam the resin layer for the intermediate layer including the foaming agent until the surface of the resin layer for the skin material is pressed into contact with the second molding surface; and cooling the melted resin layers for the base member, intermediate layer and skin material, wherein a first stepped portion formed on the lower molding die at an outer periphery of the first molding surface and a second stepped portion formed on the upper molding die at an outer periphery of the second molding surface are coupled with each other during the clamping process of the molding dies to cut out a useless remainder portion of the multilayer resin sheet.

19. The manufacturing method of the multilayer article as set forth in claim 18, wherein the resin layer for the intermediate layer is heated by energization of a surface heater provided on the second molding surface of the upper molding die.

20. The manufacturing method of the multilayer article as set forth in claim 18, wherein the resin layer for the intermediate layer is heated by energization of surface heaters respectively provided on the first and second molding surfaces of the molding dies.

21. A manufacturing method of a multilayer article composed of a rigid base member, a foamed soft intermediate layer layered on the base member and a soft skin material layered on the intermediate layer, said method comprising the steps of:

extruding a melted resin layer for the base member, a melted resin layer for the intermediate layer including a foaming agent and a melted resin layer for the skin material in the form of a multilayer resin sheet from a die-head of an extruding machine on a lower molding die of a molding machine in such a manner that the resin layer for the base member is placed on a first molding surface formed on the lower molding die of said molding machine;

moving down an upper molding die formed with a second molding surface corresponding with the surface of the skin material and clamping the upper molding die with the lower molding die in a manner such that the upper molding die is positioned to form a clearance between the first and second molding surfaces larger than the thickness of the multilayer resin sheet;

heating the upper molding die to foam the resin layer for the intermediate layer including the foaming agent until the surface of the resin layer for the skin material is pressed into contact with the second molding surface; and cooling the melted resin layers for the base member, intermediate layer and skin material, wherein the melted resin layers for the base member, intermediate layer and skin material are simultaneously extruded from extrusion slits of the die-head of said extruding machine while the die-head is being moved in a horizontal direction perpendicular to the extrusion slits.

22. A manufacturing method of a multilayer article composed of a rigid base member, a foamed soft intermediate layer formed on the base member and a soft skin material formed on the intermediate layer, said method comprising the steps of:

setting a preliminarily molded rigid base member on a first molding surface formed on a lower molding die of a molding a machine;

extruding a melted resin layer for the intermediate layer including a foaming agent and a melted resin layer for the skin material in the form of a multilayer resin sheet from a die-head of an extruding machine having extrusion slits on the lower molding die of said molding machine in such a manner that the base member and an upper outer peripheral portion of the lower molding die are fully covered with the resin layer for the intermediate layer placed thereon while the die-head of said extruding machine is being moved in a horizontal direction perpendicular to the extrusion slits;

moving down an upper molding die formed with a second molding surface corresponding with the surface of the skin material and clamping the upper molding die with the lower molding die in a manner such that the upper molding die is positioned to provide a clearance between the first and second molding surfaces larger than the thickness of the base member and the multilayer resin sheet;

heating the upper molding die of said molding machine to foam the resin layer for the intermediate layer including the foaming agent until the surface of the resin layer for the skin material is pressed into contact with the second molding surface; and cooling the resin layers for the intermediate layer and skin material.

23. The manufacturing method of the multilayer article as set forth in claim 22, wherein the resin layer for the skin material consists of thermoplastic elastomer, the resin layer for the intermediate layer consists of ethylenic copolymer copolymerized with ethylene and at least radical copolymerizable acid anhydride, and the base member is made of a porous material.

24. The manufacturing method of the multilayer article as set forth in claim 23, wherein the thermoplastic elastomer is olefinic thermoplastic elastomer and/or styrenic thermoplastic elastomer.

25. The manufacturing method of the multilayer article as set forth in claim 13, wherein the thermoplastic elastomer has a melting flow rate of 0.1–200 g/10 min at 230° C. under load of 2.16 and a shore A hardness in a range of 50–96.

26. A manufacturing method of a multilayer article composed of a rigid base member, a foamed soft intermediate layer formed on the base member and a soft skin material formed on the intermediate layer, said method comprising the steps of:

setting a preliminarily molded rigid base member on a first molding surface on a lower molding die of a molding machine;

extruding a melted resin layer for the intermediate layer including a foaming agent and a melted resin layer for the skin material in the form of a multilayer resin sheet from a die-head of an extruding machine on the lower molding die of said molding machine in such a manner that the base member and an upper outer peripheral portion of the lower molding die are fully covered with the resin layer for the intermediate layer placed thereon while the die-head of said extruding machine is being moved in a horizontal direction;

moving down an upper molding die formed with a second molding surface corresponding with the surface of the skin material and clamping the upper molding die with the lower molding die in a manner such that the upper molding die is positioned to provide a clearance between the first and second molding surfaces larger than the thickness of the base member and the multilayer resin sheet;

heating the upper molding die of said molding machine to foam the resin layer for the intermediate layer including the foaming agent until the surface of the resin layer for the skin material is pressed into contact with the second molding surface; and cooling the resin layers for the intermediate layer and skin material, wherein the resin layer for the skin material comprises a thermoplastic elastomer, the resin layer for the intermediate layer comprises an ethylenic copolymer of ethylene and at least one radical copolymerizable acid anhydride, and the base member is made of a porous material in the form of a wooden material consisting of wood fibers bonded by thermosetting resin.

27. The manufacturing method of the multilayer article as set forth in claims 26, wherein the multilayer resin sheet is pressed into contact with the base member under vacuum pressure applied to the first molding surface of the lower molding die of said molding machine.

28. The manufacturing method of the multilayer article as set forth in claim 26, wherein a useless remainder portion or the multilayer resin sheet protruded outwardly from the first molding surface of the lower molding die is cut out during the clamping process of the molding dies.

29. A manufacturing method of a multilayer article composed of a rigid base member, a foamed soft intermediate layer formed on the base member and a soft skin material formed on the intermediate layer, said method comprising the steps of:

setting a preliminarily molded rigid base member on a first molding surface on a lower molding die of a molding machine;

extruding a melted resin layer for the intermediate layer including a foaming agent and a melted resin layer for the skin material in the form of a multilayer resin sheet from a die-head of an extruding machine on the lower molding die of said molding machine in such a manner that the base member and an upper outer peripheral portion of the lower molding die are fully covered with the resin layer for the intermediate layer placed thereon while the die-head of said extruding machine is being moved in a horizontal direction;

moving down an upper molding die formed with a second molding surface corresponding with the surface of the skin material and clamping the upper molding die with the lower molding die in a manner such that the upper molding die is positioned to provide a clearance between the first and second molding surfaces larger than the thickness of the base member and the multilayer resin sheet;

heating the upper molding die of said molding machine to foam the resin layer for the intermediate layer including the foaming agent until the surface of the resin layer for the skin material is pressed into contact with the second molding surface; and cooling the resin layers for the intermediate layer and skin material, wherein a first stepped portion formed on the lower molding die at an outer periphery of the first molding surface and a second stepped portion formed on the upper molding die at an outer periphery of the second molding surface are coupled with each other during the clamping process of the molding dies to cut out a useless remainder portion of the multilayer resin sheet protruding outwardly from the first molding surface of the lower molding die.

30. The manufacturing method of the multilayer article as set forth in claim 29, wherein the resin layer for the intermediate layer is heated by energization of a surface heater provided on the second molding surface of the upper molding die.

31. The manufacturing method of the multilayer article as set forth in claim 29, wherein the melted resin layers for the intermediate layer and skin material are simultaneously extruded from extrusion slits of a die-head of the extruding machine while the die-head is being moved in a horizontal direction perpendicular to the extrusion slits of the die-head.

* * * * *